SUBSCRIPTION TELEVISION SYSTEM

Original Filed June 4, 1952 12 Sheets-Sheet 1

CARL G. EILERS
ERWIN M. ROSCHKE
*INVENTORS.*

BY Francis W. Crotty

THEIR ATTORNEY.

SUBSCRIPTION TELEVISION SYSTEM

Original Filed June 4, 1952 12 Sheets-Sheet 2

CARL G. EILERS
ERWIN M. ROSCHKE
*INVENTORS.*

BY Francis W. Crotty

THEIR ATTORNEY.

SUBSCRIPTION TELEVISION SYSTEM

Original Filed June 4, 1952 12 Sheets-Sheet 3

CARL G. EILERS
ERWIN M. ROSCHKE
INVENTORS.

BY Francis W. Crotty
THEIR ATTORNEY.

SUBSCRIPTION TELEVISION SYSTEM

Original Filed June 4, 1952 12 Sheets-Sheet 4

CARL G. EILERS
ERWIN M. ROSCHKE
*INVENTORS.*

BY Francis W. Crosby

THEIR ATTORNEY.

SUBSCRIPTION TELEVISION SYSTEM

Original Filed June 4, 1952 12 Sheets-Sheet 5

INVENTORS:
CARL G. EILERS
ERWIN M. ROSCHKE
BY Francis W. Crosby
THEIR ATTORNEY.

SUBSCRIPTION TELEVISION SYSTEM

Original Filed June 4, 1952 12 Sheets-Sheet 6

CARL G. EILERS
ERWIN M. ROSCHKE
INVENTORS.
BY Francis W. Crotty
THEIR ATTORNEY.

SUBSCRIPTION TELEVISION SYSTEM

Original Filed June 4, 1952 12 Sheets-Sheet 7

CARL G. EILERS
ERWIN M. ROSCHKE
*INVENTORS.*

BY Francis W. Crosby

THEIR ATTORNEY.

SUBSCRIPTION TELEVISION SYSTEM

Original Filed June 4, 1952 12 Sheets-Sheet 8

CARL G. EILERS
ERWIN M. ROSCHKE
*INVENTORS.*

BY Francis W. Crosby

THEIR ATTORNEY.

SUBSCRIPTION TELEVISION SYSTEM

Original Filed June 4, 1952 12 Sheets-Sheet 9

CARL G. EILERS
ERWIN M. ROSCHKE
*INVENTORS.*

BY Francis W. Crotty
THEIR ATTORNEY.

SUBSCRIPTION TELEVISION SYSTEM

Original Filed June 4, 1952 12 Sheets-Sheet 10

CARL G. EILERS
ERWIN M. ROSCHKE
INVENTORS.

BY Francis W. Crotty

THEIR ATTORNEY.

SUBSCRIPTION TELEVISION SYSTEM

Original Filed June 4, 1952 12 Sheets-Sheet 11

CARL G. EILERS
ERWIN M. ROSCHKE
*INVENTORS.*

BY Francis W. Crotty

THEIR ATTORNEY.

CARL G. EILERS
ERWIN M. ROSCHKE
INVENTORS.

BY Francis W. Crosby

THEIR ATTORNEY.

United States Patent Office

Re. 25,836
Reissued Aug. 10, 1965

25,836

SUBSCRIPTION TELEVISION SYSTEM

Carl G. Eilers, Fairbury, and Erwin M. Roschke, Des Plaines, Ill., assignors to Zenith Radio Corporation, a corporation of Delaware Original No. 2,883,449, dated Apr. 21, 1959, Ser. No. 291,714, June 4, 1952. Application for reissue Feb. 1, 1960, Ser. No. 6,086
32 Claims. (Cl. 178—5.1)

Figure 1:
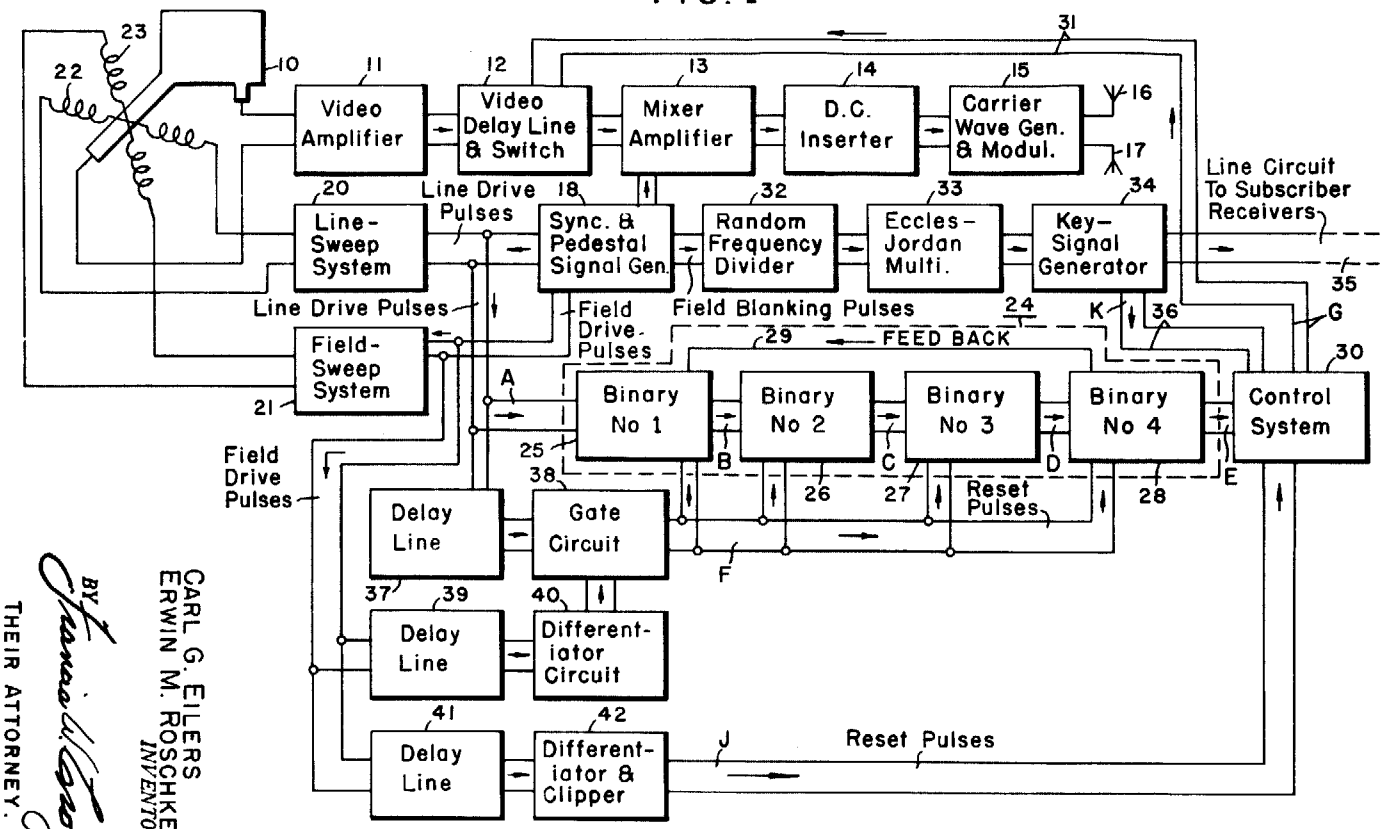

Matter enclosed in heavy brackets [ ] appears in the original patent but forms no part of this reissue specification; matter printed in italics indicates the additions made by reissue.

This invention relates to subscription television systems in which a television signal is distributed in coded form for use only in subscriber receivers having appropriate decoding apparatus actuated in accordance with the coding schedule of the telecast.

Subscription television systems as such are already known in the art, being disclosed and claimed for example in Patent 2,510,046 to Ellett et al. and in Patent 2,547,598 to Roschke, both of which are assigned to the present assignee. In these prior systems, coding of the subscription television signal is accomplished by altering some characteristic of that signal during spaced intervals which may have a duration corresponding to several field-trace intervals and which may have a time separation also corresponding to one or more field-trace intervals. In the Roschke system, for example, the relative timing of the video and synchronizing components of the television signal is altered from one value to another during spaced operating intervals which may occur during field retrace and a key signal is distributed to the subscriber receivers conveying information concerning the actual times of occurrence of such intervals. Where the signal alterations take place after one or more field intervals, the coding process may be characterized as a "slower than field rate." It is desirable in certain applications to employ "faster than field" coding, that is, coding the subscription signal by altering some characteristic thereof at intervals occurring more frequently than the field intervals. Systems of this type are described and claimed in copending application Serial No. 36,778, filed July 2, 1948, and issued October 20, 1953, as Patent 2,656,406, in the name of Richard O. Gray et al., and in copending application Serial No. 94,643, filed May 21, 1949, and issued October 20, 1953, as Patent 2,656,408, in the name of Richard O. Gray et al., both of which are assigned to the present assignee. This has the advantage of increasing the coding complexity which reduces the possibility of unauthorized deciphering and utilization of the telecast.

Certain practical or operating difficulties may be experienced in a faster-than-field coding system in providing precise registration between the coding apparatus at the subscription transmitter and the decoding apparatus at the subscriber receivers. In the systems of the Ellett and Roschke patents referred to above, the decoding apparatus at each receiver is usually actuated during field-retrace intervals in response to information distributed thereto from the transmitter. When such apparatus is used in a faster-than-field coding system, it should be actuated during the line retrace to avoid distortion, but in view of the time limitations of the line-retrace intervals, it is difficult to construct commercially practical equipment capable of being controlled at such times.

In an alternative system, no direct control is exerted upon the decoding apparatus of the subscriber receivers from the transmitter. In such a case the coding apparatus at the transmitter is actuated in accordance with a fixed coding schedule which may be derived, for example, from a magnetic tape, while the decoding apparatus at each receiver is actuated in accordance with an identical coding schedule, likewise derived from a magnetic tape. The tapes at the transmitter and receivers are synchronized by any known means so that the coding and decoding apparatus operate in time coincidence. A disadvantage in this system resides in the inflexibility and repetitive nature of the coding schedule, and in the difficulty of maintaining precise synchronization and proper phase relation between the coding apparatus at the transmitter and the decoding apparatus at each receiver.

The present invention provides a system which, like the above described system, requires no direct control from the transmitter during the field-trace intervals to actuate the encoding apparatus during such intervals, and so is especially suited for faster-than-field coding. Yet the system of the invention is such that difficulties as to precise synchronization are overcome, and the encoding apparatus may be actuated many times during each field-trace interval and in accordance with a flexible and non-repetitive coding schedule. The invention may be practiced in either the transmitter or receiver and thus the term "encoding" is employed in its generic sense to encompass either coding at the transmitter or decoding at the receiver.

It is, accordingly, an object of the present invention to provide a new and improved subscription television system in which the subscription television signal is coded with a high degree of complexity.

A further object of the invention is to provide such an improved system in which the mode of the transmitted television signal is varied at a relatively high rate to render unauthorized decoding extremely difficult.

Yet another object of the invention is to provide an improved subscription television system in which mode changes occur at intervals corresponding to a small fraction of the field-trace period.

A still further object of the invention is to provide an improved subscription television system employing faster-than-field coding and in which precise registration is maintained between the encoding apparatus at the transmitter and at the various receivers even though such coding may proceed in accordance with a random schedule.

A further object of the invention is to provide an improved encoding apparatus for use at the transmitter and/or receiver of a subscription television system which may employ faster-than-field coding.

In accordance with one aspect of the invention, a subscription television system for translating a television signal includes an encoding device having at least two distinct operating conditions each of which establishes a different operating mode in the system. A control mechanism is coupled to the encoding device and responds to an applied signal for effecting actuation of the encoding device between its operating conditions to encode the television signal in accordance with a predetermined code schedule. Means are provided for applying a periodic signal to the control mechanism to effect actuation of the encoding device in a predetermined periodic repeating sequence. Additionally, there are means coupled to the control mechanism, including means for disrupting the periodic sequence at times and effecting actuation of the encoding device to a predetermined one of its operating conditions, for modifying the code schedule.

In a specific transmitter embodiment, the control mechanism takes the form of a pulse-counting mechanism responsive to a predetermined operating condition for registering a reference count and effective upon the registration of predetermined pulse counts to effect actuation of a multi-condition coding device from one to another of its operating conditions. At least one pulse-signal source is provided for applying pulses to the counting mechanism to be counted thereby, and a reset circuit is coupled to the counting mechanism for establishing the aforesaid predetermined operating condition therein. A network is coupled to the reset circuit for actuating the reset circuit at selected intervals, and means are provided for distributing to the subscriber receiver a key signal bearing at least partial information concerning the times of actuation of the reset circuit.

A receiver comprises an image-reproducing device and an associated scanning system, and also includes circuit means for supplying the television signal to the reproducing device and its scanning system. A decoding device is included in the circuit means and has at least two operating conditions each of which establishes a different operating mode in the receiver. A pulse counting mechanism is provided which responds to a predetermined operating condition for registering a reference count and which is effective upon the registration of predetermined pulse counts related to those at the transmitter to effect actuation of the decoding device from one to another of its aforesaid operating conditions. Means is provided for deriving a series of pulses corresponding to the pulses counted at the transmitter, and for applying these pulses to the counting mechanism to be counted thereby. A reset circuit is coupled to the pulse counting mechanism for establishing the aforesaid predetermined operating condition therein, and means is also provided for utilizing the key signal from the transmitter to supply reset pulses to the reset circuit to establish the reference count in the receiver counting mechanism at times corresponding to the establishment of the reference count in the transmitter counting mechanism.

Figure 2:
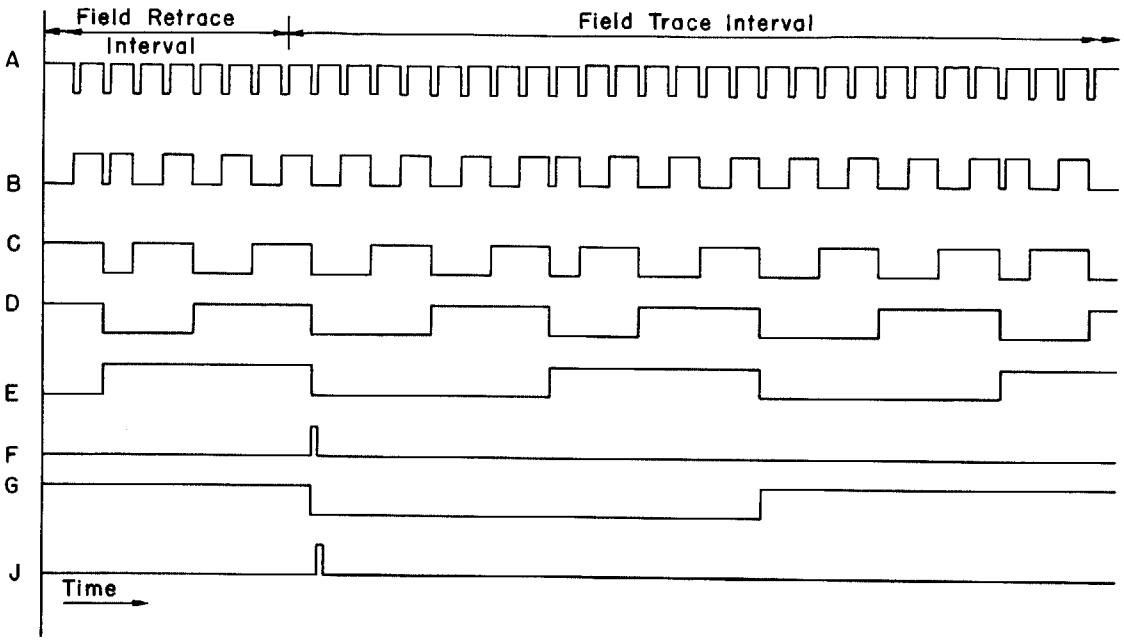
Figure 3:
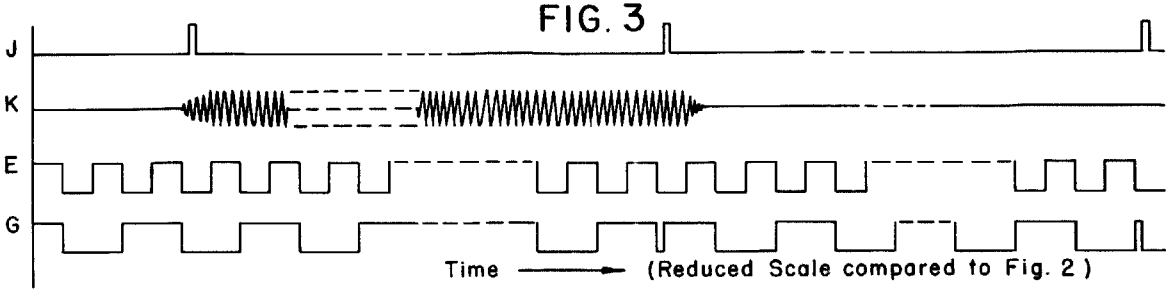
Figure 4:
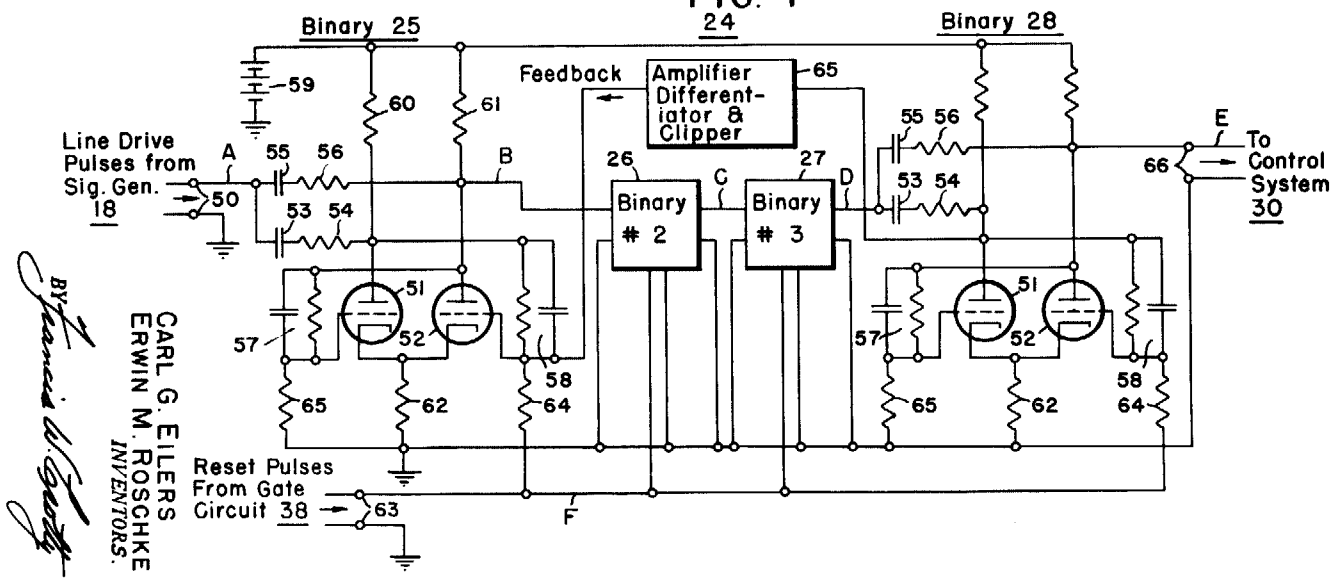
Figure 5:
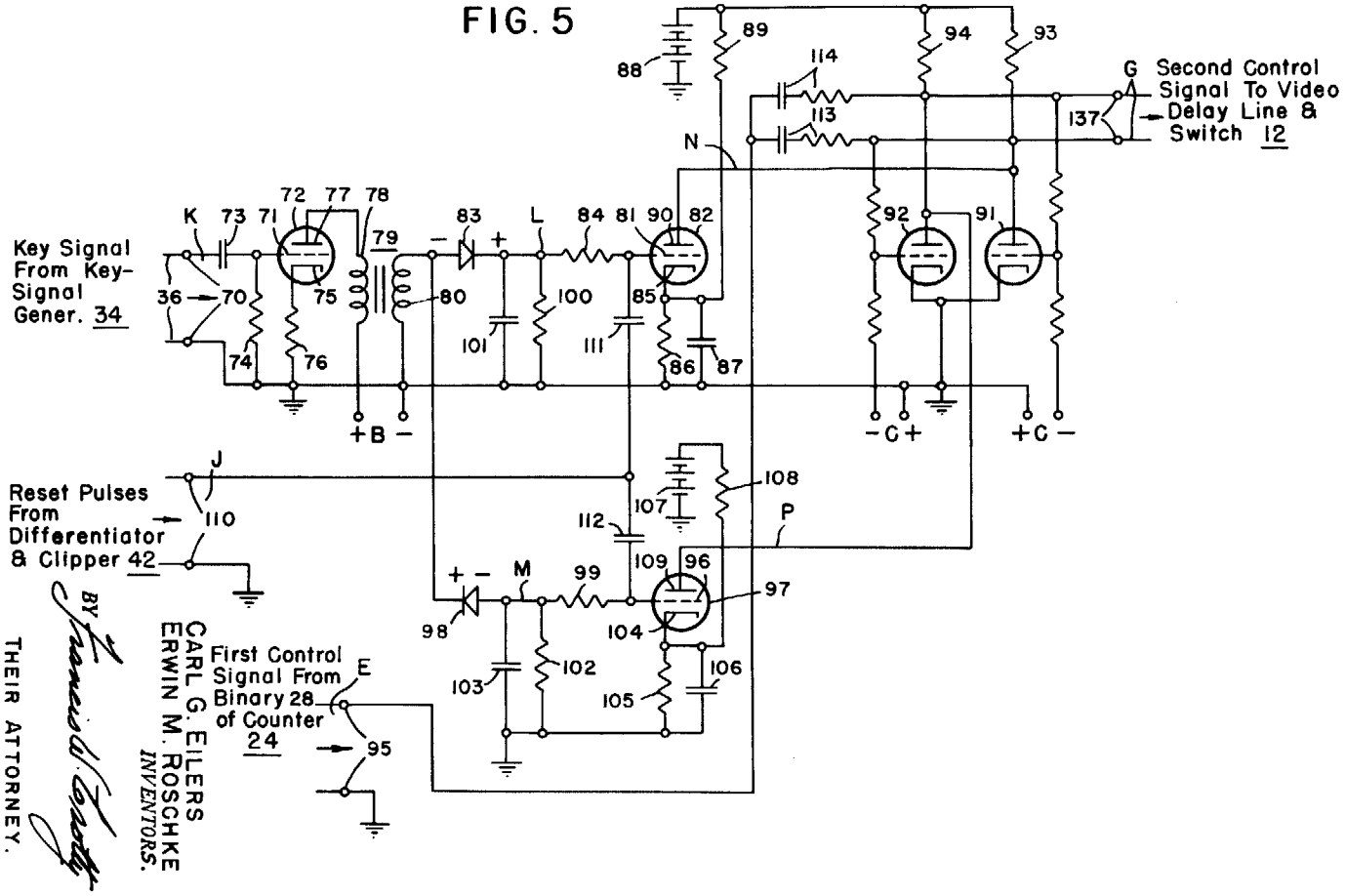
Figure 6:
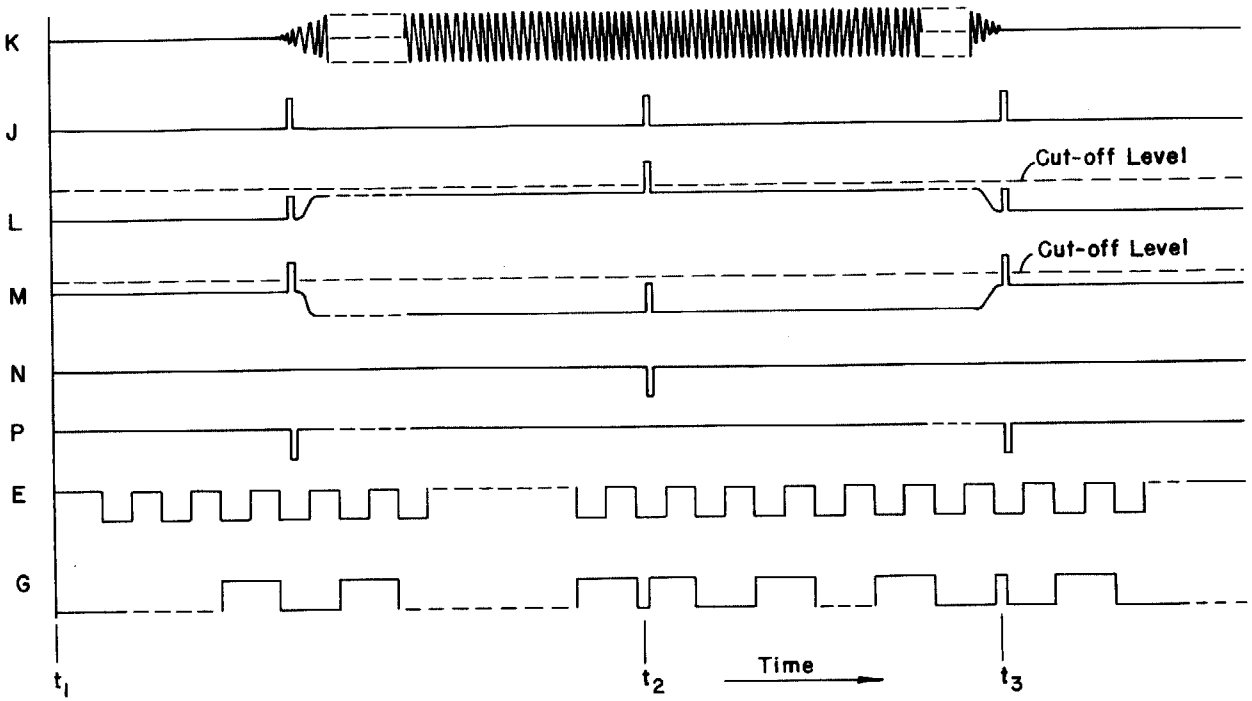
Figure 7:
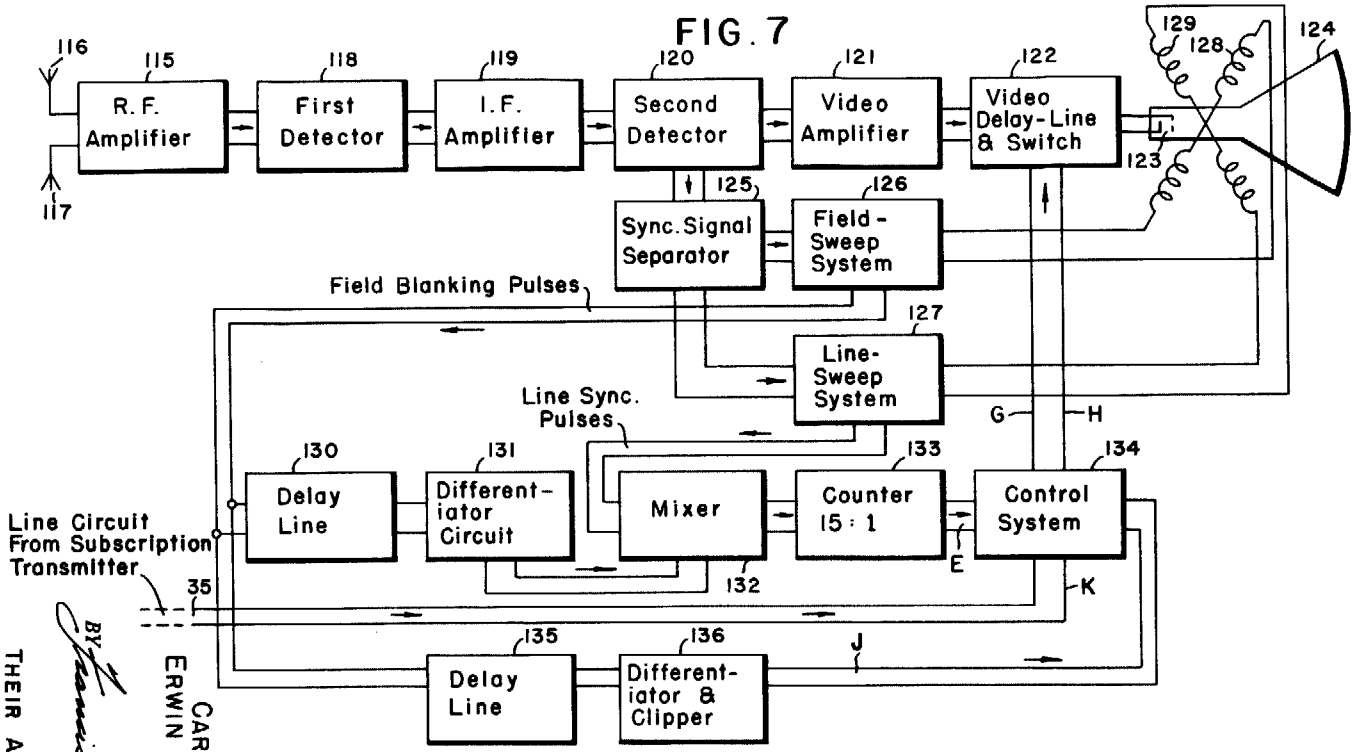
Figure 8:
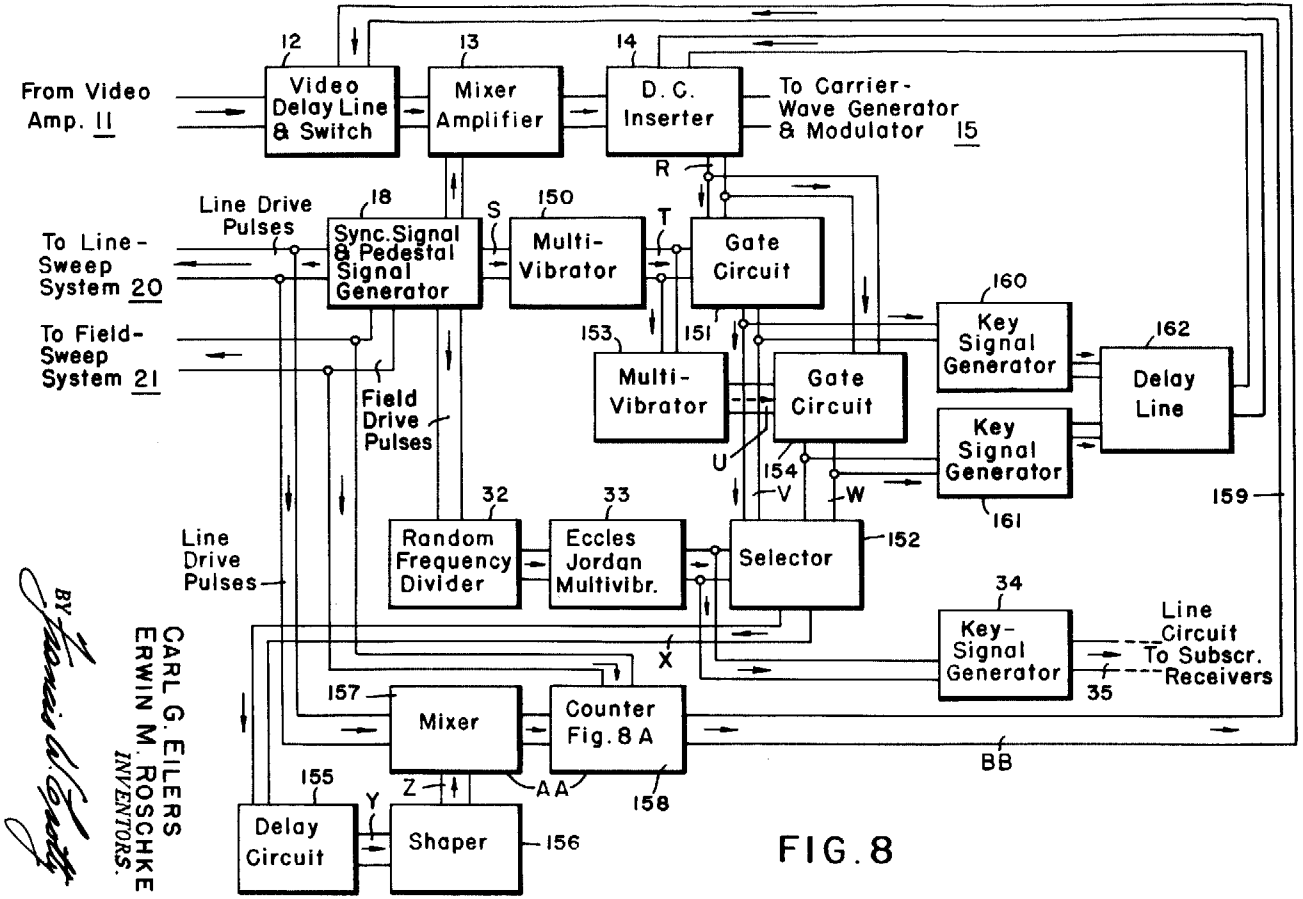
Figure 8A:
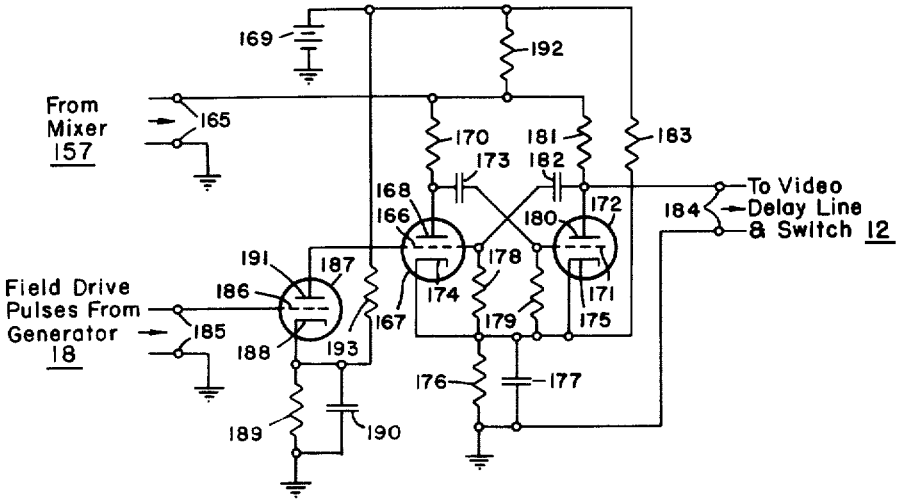

The features of this invention which are believed to be new are set forth with particularity in the appended claims. The invention itself, however, together with further objects and advantages thereof may best be understood by reference to the following description when taken in conjunction with the accompanying drawings wherein corresponding parts are identified by similar reference numerals and in which:

FIGURE 1 is a schematic representation of a subscription television transmitter constructed in accordance with one embodiment of the invention, FIGURES 2–3 comprise various curves used in explaining the operation of the transmitter of FIGURE 1, FIGURE 4 is a detailed representation of a counting mechanism constituting one of the components of the transmitter of FIGURE 1, FIGURE 5 shows a control mechanism which is included in the transmitter of FIGURE 1, FIGURE 6 comprises various curves employed in explaining the operation of the control mechanism of FIGURE 5, FIGURE 7 represents a subscription television receiver for operation in conjunction with the transmitter of FIGURE 1, FIGURE 8 represents a portion of a subscription transmitter constituting another embodiment of the invention, FIGURE 8*a* is a circuit diagram of one of the components of the arrangement of FIGURE 8.

Figure 15:
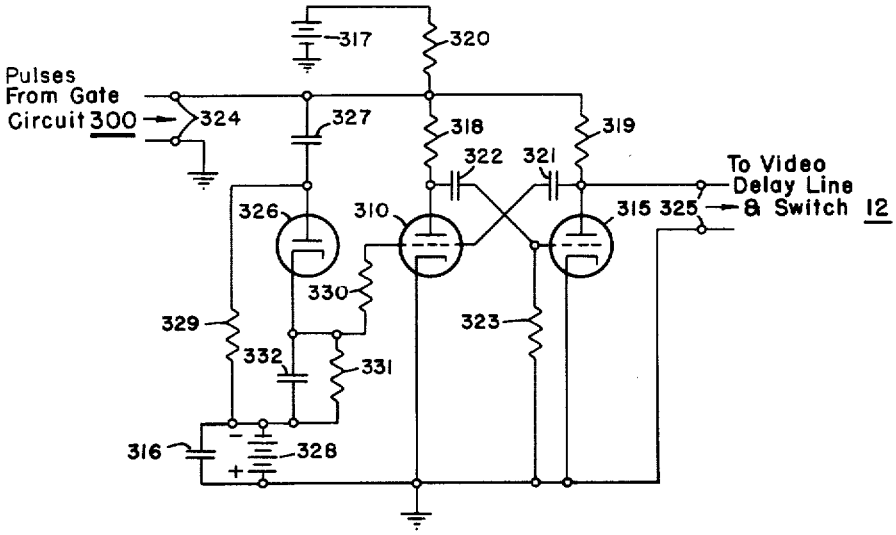
Figure 9:
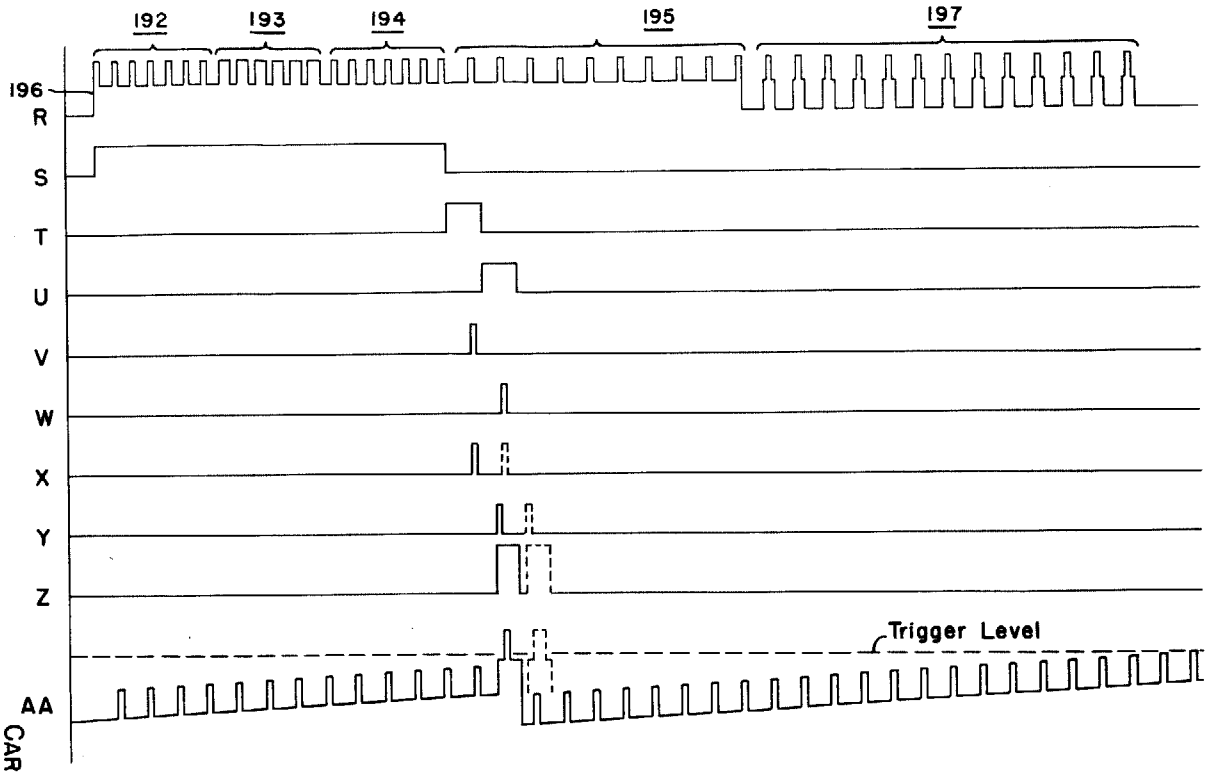
Figure 10:
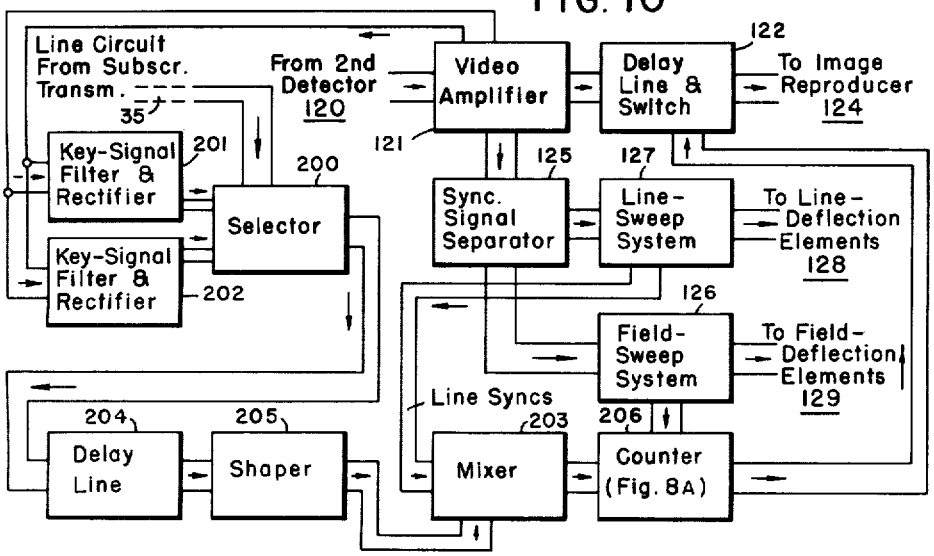
Figure 11:
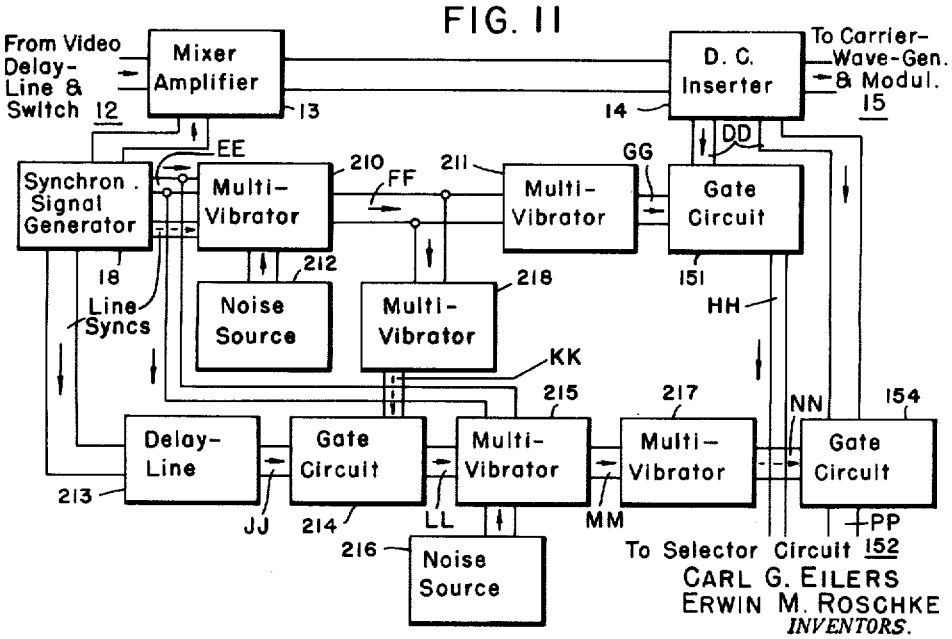
Figure 12:
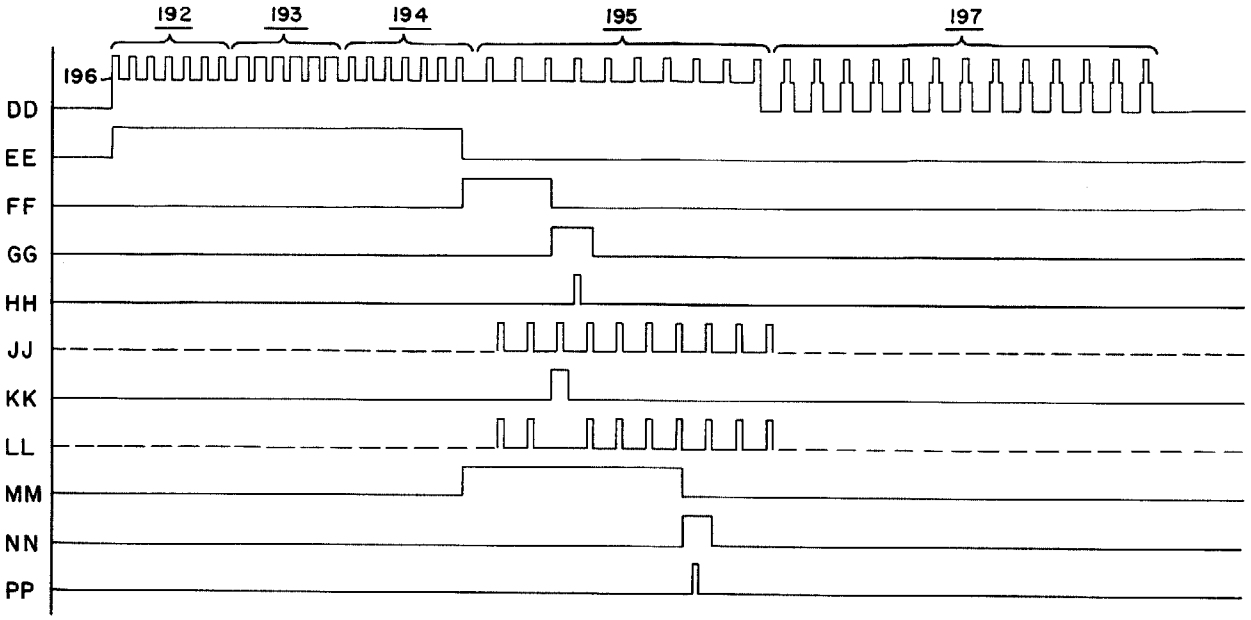
Figure 13:
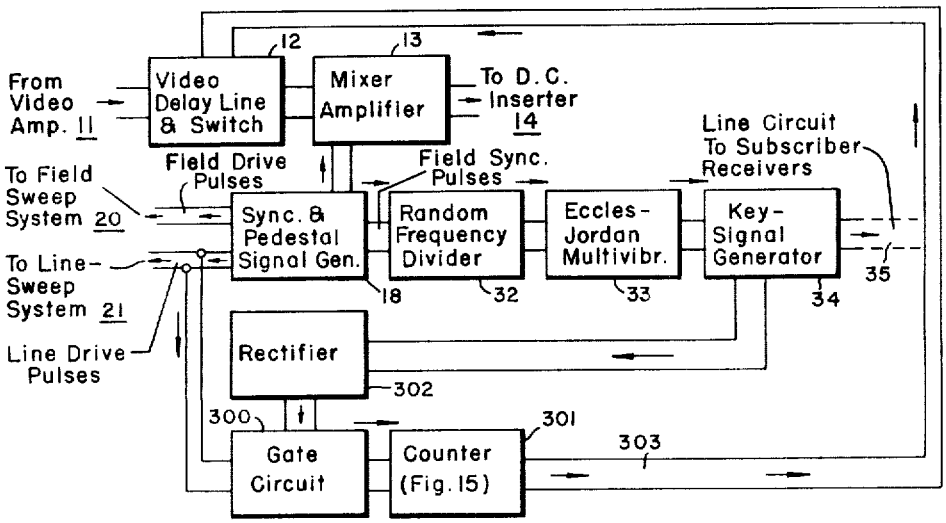
Figure 14:
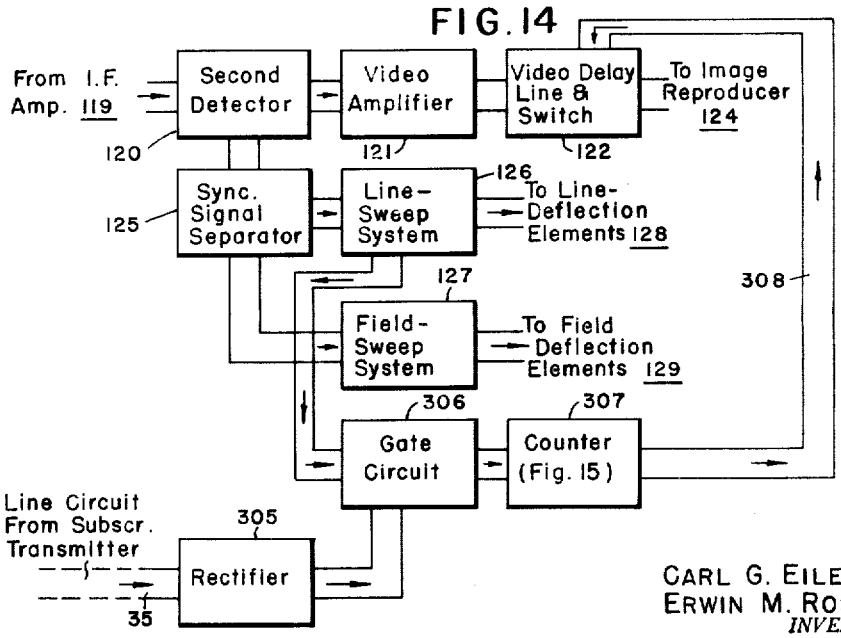

FIGURE 9 comprises various curves depicting certain operating characteristics of the transmitter of FIGURE 8, FIGURE 10 is a schematic diagram of a portion of a receiver for utilizing the signal emitted by a transmitter embodying the arrangement of FIGURE 8, FIGURE 11 represents a further embodiment of the invention, FIGURE 12 comprises various curves used in explaining the operation of the arrangement of FIGURE 11, FIGURE 13 represents the encoding portion of a transmitter constructed in accordance with still another embodiment of the invention, FIGURE 14 is a schematic diagram of the decoding portion of a receiver for operating in conjunction with the coder of FIGURE 13, and FIGURE 15 represents a counting mechanism that may be used in the arrangement of FIGURE 13 or FIGURE 14.

The transmitter of FIGURE 1 includes a picture-converting device 10 which may be an iconoscope, image orthicon or any other known device for deriving a video signal representing an image to be televised. The output terminals of device 10 are connected to a video amplifier 11 which, in turn, is connected to a video-delay line and switch 12 constructed in a manner similar to that disclosed and claimed in copending application Serial No. 243,039, entitled "Subscription Television System," filed August 22, 1951, and issued August 7, 1956, as Patent 2,758,153, in the name of Robert Adler, and assigned to the present assignee. It comprises a beam-deflection tube having at least two target elements to which video amplifier 11 may be selectively coupled in accordance with the deflected position of the beam. A time-delay network is connected in cascade with only one of the target elements so that when the beam is incident upon that target a delay is introduced into the video channel, otherwise it is not. An actuating signal applied to the deflection elements of the beam tube determines whether or not the delay network is functionally included in the video channel of the transmitter. The output terminals of unit 12 are connected to a mixer amplifier 13 having output terminals coupled through a direct-current inserter 14 to a carrier-wave generator and modulator 15, the output terminals of unit 15 being connected to a suitable antenna circuit 16, 17.

The transmitter further includes a synchronizing and pedestal signal generator 18 connected to mixer amplifier 13 to supply line- and field-synchronizing pulses and associated pedestal pulses thereto. Generator 18 also supplies line-drive pulses to a line-sweep system 20 and field-drive pulses to a field-sweep system 21 to synchronize the operation of these systems in well-known fashion. The output terminal of sweep systems 20 and 21 are connected to line-deflection elements 22 and field-deflection elements 23 associated with device 10.

Generator 18 additionally supplies line-drive pulses to a counting mechanism 24 which in this instance comprises a series or chain of binary counters 25–28, and a feed back path 29 extending from binary 28 to binary 25. The output terminals of counting mechanism 24 are connected to a control system 30 which, in turn, is connected to the deflection elements of video-delay line and switch 12 by leads 31.

Generator 18 supplies field-drive pulses to a random frequency divider 32 preferably constructed as disclosed and claimed in Patent 2,588,413, issued March 11, 1952, in the name of Erwin M. Roschke and assigned to the present assignee. The output terminals of divider 32 are connected to an Eccles-Jordan circuit or multivibrator 33 which, in turn, is connected to a key-signal generator 34. One pair of output terminals of the key-signal generator is connected to a line circuit 35 which extends to the various subscriber receivers, while another pair of output terminals is connected to control system 30 by leads 36.

Generator 18 further supplies line-drive pulses to a delay line 37 connected through a gate circuit 38 to the input circuits of the various binaries 25–28 for reset purposes as will be explained hereinafter. Generator 18 also supplies field-drive pulses to a delay line 39 connected to gate circuit 38 through a differentiating circuit 40, and supplies field-drive pulses to a delay line 41 which is connected to control system 30 through a differentiator and clipper 42.

In the operation of the transmitter, picture converting device 10 develops video-frequency components representing the image intelligence of a program to be televised, and these components are amplified in video amplifier 11 and supplied to mixer amplifier 13 through video-delay line and switch 12. Unit 12 selectively delays the video components supplied to the mixer amplifier under the control of the actuating or control signal applied thereto over leads 31 from control system 30. The video components are combined in the mixer amplifier with the synchronizing and pedestal components from generator 18; and the resulting television signal is adjusted as to background level in D.-C. inserter 14, modulated on a picture carrier in unit 15, and radiated to the subscriber receivers over antennas 16 and 17. The application of an actuating signal to unit 12 causes the radiated television signal to be effectively coded since the video components thereof do not have an invariable timing with respect to the synchronizing components; rather, their time relation is varied in accordance with a coding schedule represented by the actuating signal applied to the deflection elements of unit 12 to deflect the beam thereof from one to the other of its target elements.

In a manner to be described in detail hereinafter, counting mechanism 24 registers predetermined pulse counts in response to the recurring line-drive pulses from generator 18 and supplies to control system 30 a first control signal having characteristic variations determined by such pulse counts. Control system 30 utilizes the first control signal to supply a second control signal or actuating signal to video-delay line and switch 12 over leads 31.

The operation of counting mechanism 24 and its reset arrangement as well as control system 30 may best be understood by reference to the curves of FIGURES 2 and 3. Throughout the application whenever reference is made to one of the illustrated curves, the waveform in question will be designated by a combination of a numeral and a letter. The number will represent the figure in which the curve is displayed and the letter will indicate the particular waveform in that figure. Line-drive pulses from generator 18, shown in curve 2A, are applied with negative polarity to the input circuit of binary 25 of the counting mechanism which, in accordance with well-established principles of binary counters, effects a 2:1 frequency division and, except for the occasional double pulses, develops the signal shown in curve B. The output signal from binary 25 is applied to binary 26 which is actuated by each negative excursion of the applied signal and thereby produces the signal of curve 2C. In like manner, the output signal from binary 26 triggers binary 27 causing it to generate the signal of curve 2D, and binary 27, in turn, actuates binary 28 to generate the signal of curve 2E. Due to the fact that there are four binaries in the illustrated arrangement, the normal count or frequency division is 16:1, that is, the signal of curve 2E normally has a negative excursion corresponding to every sixteenth line-drive pulse of curve 2A. However, due to the feed-back connection 29, the count of pulses applied to mechanism 24 is 15:1. The use of a feed-back connection to establish an odd count is a well-known practice and a detailed description thereof is deemed to be unnecessary. Briefly, the feedback connection is so arranged that a positive excursion of the feed-back signal (curve 2E) affects binary 25 in the same manner as an applied line-drive pulse and advances the count registered one unit. This gives rise to the aforementioned double-pulse portions of curve 2B. The resulting 15:1 count is preferable in view of the composition of present-day commercial television signals in which each complete frame comprises two interlaced fields and is constituted by 525 lines. When a 15:1 count is used, the binary counters of mechanism 24 are always in a selected condition at the beginning of each frame, whereas if a 16:1 count were used the operating conditions of binary 25 would alternate between two conditions at the beginning of successive frames. A continuation-in-part of the present application filed under Serial No. 344,996, on March 27, 1953, now abandoned, describes a system wherein the counting ratio is established purposely at a number which is non-integrally related to, or incommensurate with, the number of line intervals per image frame. With such an arrangement, the encoding system assumes different operating conditions at the beginning of succeeding frames so that mode changes do not occur at corresponding line traces of successive frames. The reproduced picture therefore gives the appearance or illusion of "walking" or "rolling" toward the top or bottom of the image screen. Such a concept is claimed in copending application Serial No. 700,855, filed December 5, 1957, as a continuation of application Serial No. 259,169, originally filed November 30, 1951, in the name of Jacob M. Sacks, also assigned to the present assignee.

In the embodiment of FIGURE 1 of the present application, however, it is preferable that the binaries assume the same operating condition at the beginning of each frame so that a reset pulse supplied thereto at such times has no effect on the operating condition thereof unless any of the binaries should become out of step due to noise or for any other reason. Therefore, the purpose of the reset pulses is to assure that under all conditions the binaries will be in a reference condition at the beginning of each frame.

Line-drive pulses are concurrently applied to delay line 37 wherein they are delayed slightly and applied to normally-closed gate circuit 38. In addition, the field-drive pulses after a slight delay in delay line 39 are also applied to gate circuit 38 through a differentiating circuit 40. The positive pulse component derived at the trailing edge of the field-drive pulse in differentiator 40 opens gate 38 for a short time interval to pass any line pulse received in that interval from line 37. The delay times of lines 37 and 39 are so correlated that gate circuit 38 translates a pulse corresponding to, but delayed in respect of, the first line-drive pulse following the start of each frame interval. The function of delay line 37 is to introduce such a delay that this pulse from gate circuit 38 occurs after binary 25 has been actuated by the corresponding, but undelayed, line-drive pulse delivered thereto. Gate circuit 38 is also opened at the start of the second field of each frame, but due to the shift in timing between the field-drive and line-drive pulses during the second field for interlace, no line-drive pulse arrives at the gate while it is thus open. Consequently the gate circuit admits a reset pulse to binaries 25–28 shortly after the start of the first field of every frame, but at no other times. This reset pulse is shown in the curve 2F.

The binaries are constructed so that when the reset pulse is received just after the output signal of any binary has undergone a negative excursion, the reset pulse has no effect thereon. An examination of curves 2B, 2C, 2D and 2E reveals that when the system is operating normally, each reset pulse occurs just after a negative excursion of the output signal of each binary and thus it has no effect. However, should any of the binaries be out of step due to the influence of noise or for any other reason, the reset pulse immediately restores it to its proper operating condition. When a 15:1 count is adhered to, the binaries normally tend to assume such operating conditions at the start of each frame. Thus the reset pulse is merely a precaution to assure that even in the presence of noise the binaries are in a reference condition, registering a reference or zero count.

The output signal (curve 2E) of counter 24, which is referred to as the first control signal, is operated on by control system 30 to derive a second control signal or an actuating signal for application to video-delay line and switch 12. Control system 30, which is to be described more particularly hereinafter, functions in one aspect as a further binary imparting another count or division to the output signal from counter 24. In the absence of a key signal on leads 36, the control system effects a simple 2:1 division of the signal from the counter and supplies a second control signal or an actuating signal to video-delay line and switch 12, as shown in curve 2G. This signal actuates video-delay line and switch 12 between its two operating conditions to establish different operating modes in the transmitter. One mode prevails when the signal has its maximum value and another mode is established when that signal has its minimum value. The change from one mode to another occurs at a faster-than-field rate, specifically, after each group of 15 lines. At the same time, the field-drive pulses from generator 18 are delayed in delay line 41 and are differentiated and clipped in unit 42 to supply positive reset pulses, shown in curve 2J, to the control system. The reset pulses occur at the beginning of each field, just after the signal (curve 2E) from counter 24 has undergone a negative amplitude excursion. As long as there is no key signal on leads 36, the reset pulses of curve 2J maintain the shown phase relation between the signal (curve 2E) from the counter and the output signal (curve 2G) of the control system. However, whenever, a burst of key signal is present on leads 36 and for a time corresponding to the duration of such burst, the reset pulses applied to the control system effect a phase reversal of the output signal of the control system as compared with the control signal from the counter.

Therefore, the video-delay line and switch 12 is actuated every 15 lines of each field-trace interval to provide a mode change in the transmitter, and the phase of the control signal applied to switch 12 is inverted from time to time further to complicate the coding process, as determined by the key-signal generator 34. The times of the phase inversions are indicated to subscriber receivers by bursts of key signal distributed over line circuit 35.

Preferably key-signal generator 34 is energized at random intervals and in the following manner. Field-blanking pulses are supplied to random-frequency divider 32, the output of which triggers multivibrator 33 at random times determined by this division. The multivibrator develops a pulse-modulated signal which has pulse components initiated and terminated by successive randomly-divided pulses from the frequency divider and supplies that signal to the key-signal generator. The key-signal generator is turned on for the duration of each pulse component of a chosen polarity (positive for example) and supplies a burst of key signal to line circuit 35 and control system 30 for the duration of each such component.

By way of recapitulation, the curves of FIGURE 3 repeat certain of those shown in FIGURE 2 but on a reduced time scale. Curve 3J shows the reset pulses applied to control system 30 at the beginning of each field-trace interval, and curve 3K shows a key-signal burst applied thereto over leads 36 from the key-signal generator. The duration of this burst corresponds substantially to an integral multiple (one or more) of the field periods. Curve 3E shows the control signal from counting mechanism 24. Prior to the initiation of the key-signal burst control system 30 develops the signal of curve 3G with the illustrated phase relation in respect of the signal of curve 3E obtained from the counter. However, the first reset pulse of curve 3J occurring after the key-signal burst has reached full amplitude, causes the output signal of curve 3G to be inverted in phase (as shown). This inversion is maintained until the occurrence of the reset pulse immediately following the termination of the key-signal burst, the latter reset pulse re-establishing the former phase relation.

The control signal derived from control system 30 exhibits, therefore, characteristic variations in time coincidence with corresponding variations in the control signal from counter 24 applied to the control system. However, the control signal derived from the control system additionally exhibits a further variation (such as a phase reversal) from time to time in response to the key-signal bursts from generator 34. When counter 24 is constructed so that the control signal applied to control system 30 has negative amplitude excursions occurring every 15 lines of each field-trace, the control signal from the control system has a positive or a negative excursion occurring every 15 lines in correspondence with the excursions of the control signal from the counter. These excursions of the control signal from the control system operate unit 12 every 15 lines of each field trace so that a corresponding mode change in the operation of the transmitter occurs at such intervals. The counter, however, need only be reset or maintained in a desired condition at intervals corresponding to several fields, and in the intervening intervals proceeds to produce precisely timed mode changes in the transmitter at a faster-than-field rate.

FIGURE 4 shows details of the binary chain counter 24. The chain has a pair of input terminals 50 connected to generator 18 to receive the line-drive pulses. One of the terminals is grounded; the other is coupled to the anodes of a pair of electron-discharge devices 51 and 52 through networks 53, 54 and 55, 56, respectively. The anodes of those devices are cross-connected to the respective control electrodes through respective networks 57 and 58, and are further connected to the positive terminal of a source of unidirectional potential 59 through load resistors 60 and 61. The cathodes of these devices are connected to ground through a common resistor 62.

The chain also includes further input terminals 63 connected to gate circuit 38 to derive the reset pulses therefrom. One of these terminals is grounded and the other is connected to the control electrode of device 52 through a resistor 64, the control electrode of device 51 being returned to ground through a resistor 65. The anode of device 52 is connected to one of the input terminals of binary 26 which, in turn, is similarly connected to binary 27. One of the output terminals of binary 27 is coupled to the anodes of the discharge devices of the final binary 28 in a manner similar to the input connections of binary 25, and the other output terminal is grounded. The feed-back connection from binary 28 to binary 25 extends from the anode of device 51 in binary 28 to the control electrode of device 52 of binary 25 through an amplifier, differentiator and clipper 65. The anode of device 52 in the final binary is connected to one of the output terminals 66 of the chain, the other output terminal being grounded. Output terminals 66 are connected to control system 30 as shown in FIGURE 1.

In considering the operation of the counter, it will be assumed initially that the mechanism is registering a zero or reference count in which condition tube 51 of each binary is cut-off and tube 52 thereof is highly conductive. The negative-polarity line-drive pulses (curve 2A) applied to input terminals 50 trigger binary 25, that is, successive pulses reverse the conductive state of its tubes 51 and 52 causing it to generate the wave form of curve 2B. The negative excursions of the output signal of binary 25 are similarly effective in triggering binary 26 so that a frequency division or count is achieved and binary 26 generates the wave of curve 2C. The output signal of binary 26 in like manner causes binary 27 to develop the wave of curve 2D which, in turn, causes binary 28 to generate the wave of curve 2E, utilized as the first control signal and supplied to output terminals 66 for application to control system 30. During normal operation of the counting mechanism, each binary is in its aforedescribed reference condition at the beginning of each frame period and thus during the occurrence of each reset pulse of curve 2F. These reset pulses are of positive polarity and are applied to control electrodes of the conductive tubes 52 of the binaries and have no effect. If for any reason any binary becomes out of step so that its tube 52 is non-conductive when the reset pulse arrives, the reset pulse immediately triggers that binary back to its proper condition. Moreover, a negative pulse is applied to the control electrode of device 52 in binary 25 from binary 28 by virtue of the feed-back circuit just after the sixteenth count so that, in well-known manner, the counting mechanism counts 15 instead of 16 insofar as the line-drive pulses are concerned.

In this fashion, pulse counting mechanism 24 responds to a predetermined operating condition established by the reset pulses of curve 2F for registering a reference count, and is effective upon the registration of predetermined pulse counts to effect actuation of video-delay line and switch 12 from one to another of its operating conditions. The actuation of unit 12 is at a faster-than-field rate, occurring in the illustrated embodiment every fifteen lines of each field, while the reset pulses occur every second field to establish and maintain a point of reference for the count. Obviously, any other count register may be adopted to change the operating mode of the transmitter.

Control system 30 is illustrated in FIGURE 5 and may be generally similar to that disclosed and claimed in copending application Serial No. 241,012, entitled "Subscription Television System," filed August 9, 1951, and issued March 23, 1954, as Patent 2,673,239, in the name of Carl G. Eilers, and assigned to the present assignee. It has a pair of input terminals 70 connected to key-signal generator 34 over leads 36 to receive bursts of key signal. One of the terminals is grounded and the other is coupled to the control electrode 71 of an amplifier 72 through a coupling capacitor 73, the control electrode being connected to ground through a grid-leak resistor 74. The cathode 75 of device 72 is connected to ground through a resistor 76 and the anode 77 is connected to the positive terminal B+ of a source of unidirectional potential through the primary winding 78 of a transformer 79, the negative terminal of this source being connected to ground. One side of the secondary winding 80 of transformer 79 is connected to ground, and the other side of the secondary is connected to the control electrode 81 of an electron-discharge device 82 through a rectifier 83 and a series resistor 84. The junction of the rectifier and series resistor is connected to ground through a resistor 100 shunted by a capacitor 101. The cathode 85 of discharge device 82 is connected to ground through a resistor 86 shunted by a capacitor 87 and is also connected to the positive terminal of a source of unidirectional potential 88 through a resistor 89. The anode 90 of device 82 is connected to the anode of a device 91 which in conjunction with a discharge device 92 constitutes a binary counter or Eccles-Jordan multivibrator. The anodes of devices 91 and 92 are connected to the positive terminal of source 88 through resistors 93 and 94 respectively, and their cathodes are connected to ground.

The control system further includes another pair of input terminals 95 connected to binary 28, one of these terminals being grounded and the other being connected to the anodes of devices 91 and 92 through networks 113 and 114, respectively. The devices 91 and 92 are cross-connected and their control electrodes are returned through respective grid resistors to the negative terminals of a bias source C—, the positive terminals of this source being connected to ground. The anodes of devices 91 and 92 are further connected to a pair of output terminals 137 extending to video-delay line and switch 12.

The ungrounded side of secondary winding 80 is also connected to the control electrode 96 of an electron-discharge device 97 through a rectifier 98 and a series resistor 99, the junction of the rectifier and series resistor being connected to ground through a resistor 102 shunted by a capacitor 103. The cathode 104 of device 97 is connected to ground through a resistor 105 which is shunted by a capacitor 106 and is also connected to the positive terminal of a source 107 through a resistor 108. The anode 109 of device 97 is connected to the anode of device 92.

The control system includes a further pair of input terminals 110 connected to differentiating circuit 42 to derive the reset pulses for the control system, one of these terminals being grounded and the other being coupled to control electrodes 81 and 96 through coupling capacitors 111 and 112, respectively.

The operation of the control system may best be understood by reference to the curves of FIGURE 6. Whenever a burst of key signal, as shown in the curve 6K, is impressed across terminals 70 it is amplified in amplifier 72, rectified in rectifier 83, and supplied with positive polarity to the control electrode 81 of device 82. The amplified burst is also rectified in rectifier 98 and applied to control electrode 96 of device 97 but with negative polarity. The reset pulses of curve 6J from differentiator and clipper 42 are impressed across terminals 110 and are supplied to the control electrodes 81 and 96 with positive polarity. In this manner, a composite signal comprising the positive rectified bursts of key signal and positive reset pulses (shown in curve L) is supplied to the control electrode 81 of device 82, whereas a composite signal comprising the negative rectified bursts of key signal and positive reset pulses (shown in curve M) is applied to the control electrode 96 of device 97. Due to the forced bias on the cathodes of these devices, device 82 translates the reset pulses only during the intervals when they appear pedestalled on the positive rectified key-signal burst, whereas device 97 translates these pulses only during the intervals between negative rectified key-signal bursts. The reset pulses translated by device 82 appear across resistor 93 of device 91 and are shown in curve N, while the pulses translated by device 97 appear across resistor 94 of device 92 and are shown in curve P.

Devices 91 and 92 may be thought of as another binary with two stable operating conditions between which it is triggered with each negative excursion of the control signal (curve 6E) from counter 24. Therefore, if the conductive condition of the devices is altered intermediate two successive negative excursions of the control signal, a phase reversal of the output signal of the circuit of these devices is obtained. As explained previously herein, counter 24 receives reset pulses (curve 2F) which establish and maintain a particular phase relation of the control signal from the counter, as shown in curves 2E and 6E.

In the absence of key signal bursts on leads 36, the pulses of curve P are translated by the device 97 and are applied to the control electrode of device 91. If at that instant, device 91 is not cut-off, as it should be during normal operation for the assumed condition, the applied pulse (curve P) establishes that condition. As a consequence, the phase of the output signal from binary 91, 92 is indicated in curve 6G between the reference times $t_1$ and $t_2$.

Assume now that a burst of key signal appears on leads 36 between the times $t_1$ and $t_2$, and that the first pulse of curve 6J to occur after the burst reaches maximum amplitude occurs ammediately after the time $t_2$. At this time device 91 is cut-off and device 92 is conductive due to the triggering action of the control signal (curve 6E) from counter 24. (This is the normal condition referred to immediately above.) The reset pulse of curve 6J is now translated by device 82 to the control electrode of device 92 and reverses the conductive states of devices 91 and 92 as shown in curve 6G. This effects a phase reversal of the output signal from binary 91, 92 as compared with the phase preceding time $t_2$. The reversed phase condition continues until the time $t_3$ when the pulse of curve 6P succeeding the termination of the key-signal burst again introduces a phase change restoring the condition preceding the time $t_2$.

In this manner, the control signal (curve 6E) from counter 24 causes the control system to supply a second control signal or actuating signal (curve 6G) to video-delay line and switch 12. The second control signal has a selected phase relative to the first control signal when no key-signal burst is impressed across terminals 70, but has an inverted phase in response to the reception of such a key-signal burst. The reversals of phase of the actuating signal applied to the video-delay line and switch are determined by the pulses of curve 6J immediately following the initiation and termination of each key-signal burst.

The receiver of FIGURE 7, which may utilize the subscription telecast from the transmitter of FIGURE 1, includes a radio-frequency amplifier 115 having input terminals connected to an antenna circuit 116, 117 and output terminals connected to a first detector 118. The first detector is connected through an intermediate-frequency amplifier 119 to a second detector 120 which, in turn, is connected to a video amplifier 121. The video amplifier is coupled through a video-delay line and switch 122 to the input electrodes 123 of a cathode-ray image-reproducing device 124. Video-delay line and switch 122 may be similar in construction to unit 12 utilized at the transmitter, but connected in a reverse manner so that when unit 12 is in a "delay" condition unit 122 is in an "undelayed" condition and vice versa. Second detector 120 is also connected to a synchronizing-signal separator 125 which, in turn, is connected to a field-sweep system 126 and line-sweep system 127. The sweep systems 126 and 127 are connected respectively to the field-deflection elements 128 and line-deflection elements 129 of device 124.

Field-sweep system 126 is connected through a delay line 130 and a differentiating circuit 131 to a mixer 132. Line-sweep system 127 is connected through the mixer to a counter 133, and the output terminals of the counter are connected to a control system 134 which may be generally similar to control system 30 of the transmitter. Field-sweep system 126 is also connected through a delay line 135 to a differentiator and clipper circuit 136 having output terminals connected to the control system.

The subscription television signal from the transmitter of FIGURE 1 is intercepted by antenna circuit 116, 117, amplified in radio-frequency amplifier 115 and heterodyned to the selected intermediate frequency of the receiver in first detector 118. The resulting intermediate-frequency signal is amplified in intermediate-frequency amplifier 119 and detector in second detector 120 to produce a composite video signal. The video signal is amplified in amplifier 121 and supplied to the input electrodes 123 of reproducing device 124 through video delay-line and switch 122. The synchronizing components of the television signal are separated in separator 125 and supplied to sweep systems 126 and 127 in order that the field-and line-scansions of device 124 may be controlled in synchronism with the incoming signal.

Line-synchronizing pulses are derived from sweep system 127 and supplied to counter 133 through mixer 132. The counter 133 may comprise a simple multivibrator type frequency divider which in the illustrated embodiment has a 15:1 division rate in respect of the line pulses applied to the input terminals thereof. Counter 133 supplies a first control signal to control system 134 similar to the signal of curve 2E supplied to control system 30 at the transmitter.

Field-blanking pulses derived from field-sweep system 126 are delayed in delay line 130, differentiated in differentiating circuit 131 and supplied to mixer 132. The delay of line 130 is such that the positive-polarity components of the differentiated pulse from circuit 131 occur in time coincidence with the first-line synchronizing pulse of the first field of each frame of the received signal. As a result of this time coincidence, counter 133 is returned to a reference or zero count no matter what condition it might be in at that time. In this manner counter 133 is established at a reference count at the beginning of the first field of each frame with the like establishment of counter 24 at the transmitter. The technique of delay and differentiation prevents the first line-synchronizing pulse of the second or interlaced field of each frame from occurring in time coincidence with the differentiated field pulse.

The field-blanking pulses are similarly delayed in delay line 135, and differentiated and clipped in circuit 136 to supply a pulse to control system 134 at the beginning of each field, these pulses occurring in time coincidence with the reset pulses of curve 2J applied to the control system at the transmitter. The key-signal bursts from the transmitter are received over line circuit 35 and are also applied to the control system. In like manner to that at the transmitter, control system 134 develops a second control signal similar to that developed by the control system at the transmitter and under the control of the first control signal from counter 133. During the absence of key-signal bursts, a selected phase relation is maintained between the second control signal from control system 134 and the first control signal from the counter by the reset pulses from circuit 136 and, during the presence of a key signal burst, an inverted phase is maintained between these two signals by the reset pulses. Consequently, each time the video-delay line and switch 12 at the transmitter is actuated to change the timing between the video and synchronizing components of the television signal, video-delay line and switch 122 at the received is also actuated to compensate for such variations. Of course, counter 133 may take the identical form as counter 24 at the transmitter. Obvious circuit changes would have to be made to provide corresponding associated circuitry.

In the embodiment of the invention shown in FIGURE 8 additional coding is effected by varying the timing of the reset pulses applied to the counter mechanism in accordance with a coding schedule which schedule is disseminated to subscriber receivers in any appropriate manner. More specifically, synchronizing-signal generator 18 is connected to a multivibrator 150 which in turn is connected to a normally-closed gate circuit 151 having input terminals coupled to D.C. inserter 14 and output terminals connected to a selector 152. Multivibrator 150 is also coupled to a further multivibrator 153 which has output terminals connected to a normally-closed gate circuit 154. The gate circuit has input terminals connected to the D.C. inserter and output terminals connected to selector circuit 152. The selector has further input terminals connected to the junction of multivibrator 33 and key-signal generator 34, and output terminals connected through a delay circuit 155 and shaper 156 to a mixer 157. The mixer is connected to generator 18 to receive line-drive pulses therefrom and has output terminals connected to a counter 158. The counter has further input terminals connected to generator 18 to receive field-drive pulses and has output terminals connected to video-delay line and switch 12 by leads 159. The transmitter also includes a pair of key-signal generators 160 and 161 having input terminals connected respectively to the output terminals of gate circuit 151 and gate circuit 154, and output terminals connected through a delay line 162 to D.C. inserter 14.

The operation of the described arrangement may best be understood by reference to the curves of FIGURE 9 wherein curve 9R represents a portion of the television signal translated by D.C. inserter 14 including those components occurring during a field-retrace interval and the beginning of a succeeding field-trace interval. These components comprise equalizer pulses 192, a serrated field-synchronizing component 193, further equalizer pulses 194 and line-synchronizing pulses 195, all pedestalled on a field-blanking pulse 196, and additional line-synchronizing pulses 197 pedestalled on individual line-blanking pulses.

The positive-polarity signal of curve 9S is derived from generator 18 during field retrace and is normally used in standard television transmitters to gate in the equalizing and serrated field-synchronizing components 192, 193 and 194. In accordance with the present invention, this signal is additionally applied to multivibrator 150 which is triggered by the trailing edge thereof to generate the pulse of curve 9T having a duration determined by the operating cycle of the multivibrator. The trailing edge of this pulse from multivibrator 150 triggers multivibrator 153 to generate the pulse of curve 9U having a duration determined by the operating cycle of multivibrator 153. The output pulse from multivibrator 150 is delivered to gate circuit 151 while the output pulse from multivibrator 153 is supplied to gate circuit 154. The operating cycles and actuation times of multivibrators 150 and 153 are so adjusted that gate circuit 151 is opened to pass the first line-synchronizing pulse of series 195 to selector 152, as shown in curve 9V, whereas gate circuit 154 selects the second line-synchronizing pulse from series 195 for application to selector 152 as shown in curve 9W. The pulses of curves 9V and 9W are also employed, respectively, to turn on key-signal generators 160 and 161 to generate bursts of key signal corresponding in time and duration to such pulses. The key-signal generators have different operating frequencies to facilitate separating the key-signal bursts which are delayed slightly by delay line 162 and supplied to D.C. inserter 14. They are delayed so that when added to the television signal they are impressed on blanking pedestal 196 of curve 9R immediately following the corresponding line-synchronizing pulses and, in each instance, occur before the next succeeding line-synchronizing pulse. (This has not been illustrated in curve 9R because the curve is more readily understood in the absence of this additional information.

Selector 152 may conveniently comprise two electron-discharge devices feeding into a common output circuit but having individual input circuits respectively coupled to gate circuits 151, 154. Moreover, these devices are responsive in alternation according to the actuation of multivibrator 33. The output signal of that multivibrator is pulse-modulated in a random fashion by divider 32 and thus comprises positive and negative components of random duration occurring in alternation. During intervals of the positive components one device of the selector functions to translate the pulses admitted by gate circuit 151, and during intervals of the negative components the other device translates the pulses admitted by gate circuit 154. From the selector, the pulses are supplied to mixer 157 through delay circuit 155 and shaper 156. The selective actuation of the discharge devices in the selector circuit by multivibrator 33 is indicated to subscriber receivers by bursts of key signal from generator 34 which is turned on for the duration of each positive (or negative) pulse component of the output signal from the multivibrator.

Line-drive pulses from generator 18 are applied to counter 158 through mixer 157 and are counted thereby so that video-delay line and switch 12 may be actuated at a rate determined by the preselected count of the counter to be described in detail hereinafter. It is sufficient for present purposes to note that the counter has the general form of a frequency-dividing multivibrator and is actuated from one to the other of two stable operating conditions upon the registration of a preselected count of the line-drive pulses. A reference or zero count is established in the counter from time to time as determined by the pulses delivered by selector 152 and referred to as "reset pulses." These pulses are shown in curve 9X wherein the full-line representation denotes a timing corresponding to the first line-synchronizing pulse of series 195 of curve 9R, while the broken line representation denotes a timing corresponding to the second line-synchronizing pulse of that series. One or the other pulse is effective, depending upon the condition of selector 152. The pulses are delayed in circuit 155 as shown in curve 9Y and are then translated to shaper 156 which may be any known form of pulse regenerator employed to form a pedestal pulse as shown in curve 9Z. The delay of circuit 155 is such that the pedestal obtained from shaper 156 (curve 9Z) occurs in time coincidence with the next succeeding line-drive pulse obtained from generator 18 and supplied to mixer 157. Such line-drive pulse is superposed on the pedestal, as shown in curve 9AA, and exceeds the trigger level of counter 158 and returns the counter to a reference or zero count regardless of its particular operating condition at that time. Therefore, during each field-retrace interval the counter is returned to a reference count but at times corresponding to the second or third line-synchronizing pulse of series 195 (curve 9R) depending upon the condition of selector 152. It is apparent that multivibrators 150, 153 can be controlled so that gate circuits 151, 154 select pulses from series 195 other than the second and third, and that any such selected pulses may be used for the above-described purposes.

In other words, counter 158 is returned to a reference condition after each field-trace interval but at a time determined by the reset pulses from gate circuit 151 for one operating condition of selector 152, and at a time established by the reset pulses from gate circuit 154 during the other operating condition of the selector. The resetting of counter 158 varies, therefore, each time the selector is actuated from one to the other of its operating conditions, and these variations are indicated to subscriber receivers by bursts of key signal on line circuit 35. Counter 158, therefore, responds to the line-drive pulses to supply an actuating signal to video-delay line and switch 12 having amplitude excursions occurring, for example, every fifteenth line of each field trace. To complicate the coding, the counter is returned to a reference condition after each field trace but at a selected time determined by the operation of selector 152. Thus, encoding device 12 is actuated from one operating condition to the next at time intervals depending upon the duration of the counting cycle of counter 158, and the duration of the counting cycle is varied by the operation of selector 152.

The counter 158, shown in FIGURE 8*A*, comprises a pair of electron-discharge devices 167 and 172. The anode 168 of device 167 is connected to the positive terminal of a source of unidirectional potential 169 through a load resistor 170 and resistor 192 and is coupled to the control electrode 171 of device 172 through a coupling capacitor 173. The cathodes 174 and 175 of devices 167 and 172 are connected to ground through a common resistor 176 shunted by a capacitor 177, while the control electrodes of these devices are connected to the cathodes through resistor 178 and 179, respectively. The anode 180 of device 172 is connected to the positive terminal of source 169 through a load resistor 181 and resistor 192, and is coupled to control electrode 166 through a capacitor 182. Cathodes 174 and 175 are also connected to the positive terminal of source 169 through a resistor 183. Anode 180 is connected to one of the output terminals 184 of the circuit while the other output terminal is connected to ground. The circuit includes a pair of input terminals 165 connected to mixer 157 to derive the line-drive pulses, one of the terminals 165 being grounded and the other connected to the junction of resistors 170 and 192. The circuit also includes a further pair of input terminals 185 connected to generator 18 to derive field-drive pulses therefrom. One terminal 185 is grounded and the other is connected to the control electrode 186 of an electron-discharge device 187. The cathode 188 of device 187 is connected to ground through a cathode resistor 189 shunted by a capacitor 190 and is also connected to the positive terminal of source 169 through a resistor 193. The anode 191 is connected to control electrode 166 of device 167.

Devices 167 and 172 constitute a well-known frequency-dividing multivibrator differing from the usual type only in that the cathodes of the devices are established at a positive potential with respect to ground by virtue of the potentiometer connection of resistors 176 and 183. Assume initially that the multivibrator has been tripped rendering device 167 non-conductive and device 172 conductive. At this time capacitor 182 is charged to establish control electrode 166 at a more negative potential relative to cathode 174, and this charge gradually leaks off through resistor 178. Positive-polarity line-drive pulses applied across terminals 165 are delivered to the control electrodes of both devices 167 and 172. These pulses have no effect on device 172 which is conductive and have no effect on device 167 until the charge on capacitor 182 has reduced to a point where a line-drive pulse on control electrode 166 exceeds the trigger level of the device and trips the circuit to its second operating condition in which device 167 is conductive and device 172 non-conductive. The circuit parameters are so chosen that this occurs, for example, at the fifteenth line-drive pulse following the first-mentioned trip of the multivibrator.

Capacitor 173 is now charged and biases control electrode 171 more negative with respect to cathode 175, and this charge leaks off through resistor 179 sufficiently that the succeeding fifteenth line-drive pulse returns the circuit to its first described condition. In this manner, a control or actuating signal is supplied to output terminals 184 for application to video-delay line and switch 12. This signal has amplitude excursions occurring each fifteenth line of each field trace period to actuate that unit at these times and effect changes in the mode of operation of the transmitter in the manner explained in connection with FIGURE 1.

As previously mentioned, the multivibrator circuit is established at a reference condition during each field-retrace interval but at a selected time that may vary from one field-retrace interval to another or in a random rather than in a fixed pattern. This is achieved as follows. During field-trace intervals, device 187 is non-conductive due to the forced bias applied to its cathode 188 by potentiometer 189, 193 and has no effect on the circuit of devices 167 and 172. However, at the start of each field-retrace interval a field-drive pulse impressed on terminals 185 renders device 187 conductive. For the duration of the field drive pulse, control electrode 166 of device 167 is driven negative with respect to its cathode 174, assuming a potential corresponding substantially to the potential of cathode 188. Resistors 193 and 189 are given such values with respect to resistors 183 and 176 that the potential of cathode 188 is much less than that of cathode 174. For example, cathode 174 may have a forced bias potential of approximately thirty volts, whereas cathode 188 has a forced bias potential of two or three volts. Consequently, the circuit of devices 167 and 172 is established in that operating condition wherein device 167 is non-conductive and device 172 is conductive. Capacitor 182 has acquired a high negative charge so that after the termination of the field-drive pulse the circuit of devices 167 and 172 remains in this condition and does not respond to the immediately subsequent line-drive pulses impressed across terminals 165. Finally, however, a line-drive pulse pedestalled upon the output pulse from shaper 156 is received from mixer 157 with an amplitude level high enough to trigger the multivibrator to its alternate operating condition. In this manner, during each field-retrace interval, the circuit of devices 167 and 172 is initially established in a first operating condition and is triggered to its second operating condition by the line-drive pulse combined with a pedestal pulse in mixer 157. Therefore, a fixed phase is established in the trigger circuit during each field-retrace interval but under the time control exercised by selector 152 which determines the time of occurrence of the output pulse from shaper 156.

The receiver arrangement of FIGURE 10 is intended to operate in conjunction with the transmitter coding system of FIGURE 8. It includes a selector 200 connected to video amplifier 121 through a pair of parallel arranged key-signal filter and rectifier units 201 and 202, respectively selective to the frequencies of the key signals produced by generators 160 and 161 of FIGURE 8. The selector is further connected to line circuit 35 extending to the subscription transmitter and has output terminals coupled to a mixer 203 through a delay line 204 and a shaper circuit 205. Mixer 203 has input terminals connected to the line-sweep system 127 of the receiver to derive line-synchronizing pulses therefrom and has output terminals connected to a counter 206. Counter 206 is also connected to a field-sweep system 126 to derive field-synchronizing pulses therefrom and has output terminals connected to delay line and switch 122 included in the video channel of the receiver.

The bursts of key signal selected and rectified by units 201 and 202 are impressed on selector 200 which is controlled by the key-signal bursts received over line circuit 35 to translate one or the other of the rectified key signals to delay line 204 in the same manner as and in time coincidence with the application of one or the other of the pulse outputs of selector 152 at the transmitter to its associated delay line 155. The selected and translated pulses, after a delay in line 204, are shaped in circuit 205 and supplied to mixer 203 where they arrive in time coincidence with the pulses of curve 9Z at the transmitter. Counter 206, which may be similar in construction to counter 158 at the transmitter, supplies a control signal to delay line and switch 122 to actuate that unit in synchronism, but in a compensating sense, with respect to the actuation of unit 12 at the transmitter. During each field-retrace interval, counter 206 receives a field-synchronizing pulse from field-sweep system 126 as well as line-synchronizing pulses from line-sweep system 127 and a pedestal pulse from shaper 205 which conjointly phase the counter as described in connection with FIGURE 8A. In this manner, the receiver compensates for the timing variations in the television signal, which variations occur during field trace intervals at intervals corresponding, for example, to every 15 lines. Moreover, the counter is established at a reference count during each field-retrace interval in time coincidence with the establishing of a reference count at the transmitter as determined by the key signal received over line 35 and supplied to selector 200 which accordingly translates output pulses from unit 201 or unit 202.

In the transmitter arrangement of FIGURE 8, two pulses are selected in each field-retrace period from the series 195 (curve 9R) of line-drive pulses and one or the other is employed in establishing a reset condition or reference count in the counter. A more flexible arrangement, providing for a wider selection of pulses from series 195, is illustrated in FIGURE 11. In that embodiment, a multivibrator 210 has one set of input terminals connected to synchronizing-signal generator 18 and a further set of input terminals connected to a noise source or generator 212 while the output terminals are connected through another multivibrator 211 to gate circuit 151. Generator 18 is also connected through a delay line 213 to a gate circuit 214 having output terminals connected to the input terminals of a multivibrator 215 which has further input terminals directly connected to generator 18, still further input terminals connected to a noise source 216 and output terminals connected through a multivibrator 217 to gate circuit 154. The output terminals of multivibrator 210 are also connected through a multivibrator 218 to gate circuit 214. As previously, the input terminals of gate circuits 151 and 154 are connected to direct-current inserter 14 and their output terminals are connected to selector circuit 152.

In considering the operation of the circuit of FIGURE 11 reference is made to the curves of FIGURE 12, wherein curve 12DD represents the synchronizing and pedestal components of a portion of the television signal translated by inserter 14, similar to the representation of curve R of FIGURE 9. Synchronizing-signal generator 18 supplies the signal of curve 12EE (which is similar to the signal of curve S of FIGURE 9) to multivibrator 210 and the trailing edge of that signal triggers the multivibrator from its first to its second operating condition. Line-drive pulses from generator 18 are concurrently supplied to multivibrator 210, being superposed on the noise signal from source 212 to return the multivibrator to its first operating condition when the amplitude of the composite signal exceeds a selected triggering level. This voltage level may be attained at random times in successive field-retrace intervals in view of the random amplitude characteristic of the noise signal. Multivibrator 210 generates, therefore, the signal of curve 12FF, which has a pulse component during each field-retrace interval with a fixed leading edge determined by the trailing edge of the signal of curve 12EE and a variable or random trailing edge occurring in time coincidence with one of the synchronzing pulses of the series 195, as determined by the noise signal from source 212. The trailing edge of the signal from multivibrator 210 triggers multivibrator 211 from its first to its second operating condition but that multivibrator is restored to its first condition after a fixed relay determined by the operating cycle thereof. The resulting signal, which is delivered to gate circuit 151, is shown in curve 12GG and it actuates the gate circuit to select one pulse from series 195. The pulse selected during one field-retrace interval is shown in the curve 12HH and is supplied to selector 152. The pulses of curve 12HH may correspond to different ones of the line-synchronizing pulses of series 195 for successive field-retrace intervals and, in effect, their timing varies from one field-retrace interval to another. Multivibrator 210 has an operating cycle such that it automatically returns to its first operating condition substantially in time coincidence with the third from last pulse of the series 195 if the conjoint effect of the line-drive pulses and noise signal has not forced an earlier or accelerated return. Since gate 151 is opened to admit the line pulse immediately following such return of multivibrator 210, the gate may select any pulse of the series 195 within the limits of the second pulse and the second to last pulse.

Multivibrator 215 is also triggered from its first to its second operating condition by the trailing edge of the pulse component of curve 12EE, and line-drive pulses are supplied thereto through delay line 213 and gate circuit 214. The time relation of these line-drive pulses with respect to the line-synchronizing pulses of series 195 is shown in curve 12JJ and the reason for their delay will be explained hereinafter. The trailing edge of the signal of multivibrator 210 (curve 12FF) triggers multivibrator 218 which develops the signal of curve 12KK, comprising a pulse having a duration less than the time separation of the line-drive pulses and timed to overlap that pulse of the series 12JJ which follows directly the actuation of multivibrator 218. The output pulse from this multivibrator holds gate circuit 214 closed and thereby suppresses one pulse from the series of curve 12JJ. The output pulses from gate circuit 214 are shown in curve 12LL and the suppressed pulse corresponds to the pulse of series 195 that returned the multivibrator 210 to its initial condition. Multivibrator 215 is returned to its initial condition whenever the combined amplitude of the signal from noise source 216 and any of the pulses of curve 12LL exceeds a triggering level. As a consequence, it develops the pulse signal of curve 12MM having a fixed leading edge determined by the trailing edge of the pulse of curve 12EE but having a variable trailing edge terminated in time coincidence with a randomly selected one of the pulses of curve 12LL. The trailing edge of the output signal of multivibrator 215 (curve 12MM) triggers multivibrator 217 to develop the signal of curve 12NN which actuates gate circuit 154 to select that pulse from series 195 which occurs within the actuating time of the gate as shown in curve 12PP. Multivibrator 215 has an operating cycle such that it automatically returns to its first operating condition substantially in time coincidence with the second from last pulse of series 195 if the conjoint effect of the line-drive pulses and noise signal has not forced an earlier or accelerating return. Since gate 154 is opened to admit the line pulse immediately following such return of multivibrator 215 the gate may select any pulse of series 195 within the limits of the second pulse and the last pulse and excepting the pulse selected by gate 151, as will be seen.

Accordingly, in each field retrace gate circuit 151 selects one pulse of the series 195 while gate 154 selects another pulse from that series, and the selection by either or both may vary in a random fashion from one field-retrace interval to another. Due to the delay introduced by line 213 and the effect of multivibrator 218 in closing gate circuit 214 against the translation of pulses as aforedescribed, multivibrators 215 and 217 are prevented from opening gate circuit 154 in time coincidence with the opening of the companion gate 151. Therefore, even though gate circuits 151 and 154 make random pulse selections from series 195, they never select the same pulse of the series in any field retrace. The pulses from the gate circuits may be supplied to selector 152 when the arrangement of FIGURE 11 replaces the counterpart of the transmitter of FIGURE 8, in which case, the operation of the transmitter and the receiver of FIGURE 10 is generally similar to that already described.

In the previously-described embodiments of the invention, the key signal from key-signal generator 34 is shown as distributed to subscriber receivers over line circuit 35. This private link is desirable since the key signal contains information concerning the coding schedule. However, there is no reason why the key signal could not be distributed as a modulation component of the picture or sound carriers. When the latter technique is employed it might be preferable to code the key signal to preserve secrecy. Suitable mechanisms for coding the key signal are disclosed, for example, in copending application Serial No. 281,418, Morris et al., filed April 9, 1952, and issued July 15, 1958, as Patent 2,843,656; application Serial No. 249,262, Druz, filed October 2, 1951, now abandoned; and application Serial No. 254,099, Ellett, filed October 31, 1951, and issued November 13, 1956, as Patent 2,770,803, all of which are assigned to the present assignee.

FIGURE 13 shows the transmitter portion of yet another embodiment of the invention. The arrangement of FIGURE 13, includes a gate circuit 300 having one set of input terminals connected to synchronizing-signal generator 18 to receive line-drive pulses therefrom to be delivered to a counter 301 described in detail hereinafter. Gate circuit 300 is also coupled to key-signal generator 34 through a rectifier 302. Output terminals of counter 301 are connected to video-delay line and switch 12 by leads 303.

Counter 301 effects actuation of video-delay line and switch 12 upon the registration of a preselected count of the line-drive pulses and returns automatically to a reference or zero count upon the interruption of such pulses for an interval greater than their normal time separation. The pulses may be interrupted from time to time in order to return counter 301 to a reference count by gate circuit 300 under the control of rectified bursts of key signal from generator 34.

The receiver of FIGURE 14, which may operate in conjunction with the transmitter of FIGURE 13, includes a gate circuit 306 to which are applied the bursts of key signal received over line circuit 35 and rectified in rectifier 305. The gate circuit has input terminals connected to line-sweep system 126 to receive line-synchronizing pulses therefrom, and has output terminals connected to a counter 307 which may be similar to counter 301 of the transmitter. Counter 307 is connected to video-delay line and switch 122 by leads 308.

The line-synchronizing pulses supplied to counter 307 are counted thereby and video-delay line and switch 122 is actuated upon the registration of a preselected count corresponding to the pulse count of counter 301 which effects a mode change at the transmitter. Moreover, counter 307 is returned to a reference count in time coincidence with the return of counter 301 to a zero count due to the interruption of the line-synchronizing pulses by gate circuit 306 in response to a burst of key signal received over line 35. Video-delay line and switch 122 is actuated, therefore, coincidently with the actuation of unit 12 at the transmitter but in a complementary sense so that the receiver may effectively decode the received subscription television signal.

An appropriate circuit for counter 301 of FIGURE 13 is illustrated in FIGURE 15 and comprises a pair of electron-discharge devices 310 and 315. The cathodes of these devices are connected to ground and their anodes are connected to the positive terminal of a source of unidirectional potential 317 through resistors 318 and 319, respectively, and through a common resistor 320. The control electrode of device 310 is coupled to the anode of device 315 through a capacitor 321, and the control electrode of device 315 is coupled to the anode of device 310 through a capacitor 322, the latter control electrode being connected to the cathodes through a resistor 323. The circuit has a pair of input terminals 324 connected to gate circuit 300. One of the input terminals is grounded and the other is connected to the junction of resistors 318 and 320. The circuit also has a pair of output terminals 325 connected to video-delay line and switch 12, one of the output terminals being grounded and the other connected to the anode of device 315.

The ungrounded input terminal 324 is coupled to the anode of a diode 326 through a capacitor 327. The anode is further connected to the negative terminal of a source of unidirectional potential 328 through a resistor 329, the positive terminal of this source being connected to ground and the source being shunted by a capacitor 316. The control electrode of device 310 is returned to the negative terminal of source 328 through series resistors 330 and 331, resistor 331 being shunted by a capacitor 322 and the junction of these resistors being connected to the cathode of the diode.

Devices 310 and 315 form a well-known type of multivibrator frequency divider essentially similar to that shown in FIGURE 8A. Positive line-drive pulses impressed across terminals 324 trigger the multivibrator from one to another of its operating conditions upon the registration of preselected pulse counts. The positive line-drive pulses are also supplied to capacitor 332 through capacitor 327 and diode 326 and so long as such pulses are applied to terminals 324, capacitor 332 is maintained in a charged condition so that it constitutes a source of positive potential interposed between negative source 328 and the control electrode of device 310 effectively cancelling the potential of the latter source insofar as device 310 is concerned. However, when the line-drive pulses are interrupted for a time sufficient to allow the charge on capacitor 332 to leak off through resistor 331, the control electrode of device 310 is driven negative. This returns the multivibrator to its initial operating condition and maintains it in that condition until line pulses are agan impressed across terminals 324 and capacitor 332 is again charged. It is evident that the time-constant of network 331–332 must be longer than the time separation of the line-drive pulses so that the multivibrator is established in a reference condition only upon the interruption of these pulses for an interval longer than such time separation.

The invention provides, therefore, an improved subscription television system in which the subscription television signal is coded with a high degree of complexity. In the system of this invention the mode of the subscription television signal may be varied at a faster-than-field rate, and yet precise registration is maintained between the coding apparatus at the transmitter and the decoding apparatus at the various receivers.

While particular embodiments of the invention have been shown and described, modifications may be made, and it is intended in the appended claims to cover all such modifications as may fall within the true spirit and scope of the invention.

We claim:

1. An encoding arrangement for a subscription television system comprising: an encoding device having at least two operating conditions each of which establishes a different operating mode in said system; a control mechanism for producing a control signal having a characteristic that varies upon the completion of a sequence of operating steps to represent a predetermined periodically repeating code pattern and responsive to the establishment of a predetermined operating condition within any such sequence for interrupting such sequence and initiating another sequence of said operating steps; means coupled to said control mechanism, and including means for establishing said predetermined operating condition prior to completion of its sequence of operating steps to interrupt said sequence, for varying said code pattern in a predetermined manner; and means for utilizing said control signal to effect actuation of said encoding device.

2. An encoding arrangement for a subscription television system comprising: an encoding device having at least two operating conditions each of which establishes a different operating mode in said system; a control mechanism for producing a control signal having a characteristic that varies upon the completion of a sequence of operating steps to represent a predetermined periodically repeating code pattern and responsive to an applied reset pulse within any such sequence for interrupting such sequence and initiating another sequence of said operating steps; means, including means for supplying reset pulses to said control mechanism prior to completion of its sequence of operating steps to interrupt said sequence from time to time, for varying said code pattern in a predetermined manner; and means for utilizing said control signal to effect actuation of said encoding device.

3. An encoding arrangement for a subscription television system comprising: an encoding device having at least two operating conditions each of which establishes a different operating mode in said system; a generating system for producing a first control signal having characteristic variations representing a periodically repeating first code pattern; a pulse-counting mechanism included in said generating system and responsive to the registration of preselected pulse counts to determine the aforesaid variations of said first control signal; means for applying pulses to said counting mechanism; means including another pulse-counting mechanism for utilizing said first control signal to derive a second control signal having a characteristic that varies upon the completion of a sequence of operating steps of said other counting mechanism to represent a periodically repeating second code pattern; means, including means coupled to at least one of said counting mechanisms for interrupting its sequence of operating steps, for varying said second code pattern in a predetermined manner; and means for utilizing said second control signal to actuate said encoding device.

4. An encoding arrangement for a subscription television system comprising: an encoding device having at least two operating conditions each of which establishes a different operating mode in said system; a pulse counting mechanism effective upon the registration of a predetermined pulse count to effect actuation of said encoding device from one to another of its aforesaid operating conditions; at least one pulse source for applying pulses to said counting mechanism to effect cyclic operation thereof; a reset circuit responsive to an applied pulse for establishing a reference count registration in said counting mechanism in respect of the count of pulses from said source; a signal source for providing a signal having a random characteristic; and means, including means coupled to said signal source for applying reset pulses to said reset circuit having a timing that varies in accordance with a coding schedule determined at least in part by said random characteristic, for repeatedly disrupting said cyclic operation of said counting mechanism.

5. A subscription television system comprising: a signal source for producing a television signal including video components and synchronizing components; an encoding device coupled to said source having at least two operating conditions each of which establishes a different operating mode in said system effectively to encode said television signal from said source; a pulse counting mechanism responsive to a predetermined operating condition for registering a reference count and effective upon the registration of predetermined pulse counts to effect actuation of said encoding device from one to another of its aforesaid operating conditions; means coupled to the aforesaid signal source for applying said synchronizing components to said counting mechanism to effect cyclic operation thereof; a reset circuit coupled to said pulse counting mechanism and responsive to an applied pulse for establishing said predetermined operating condition; and means, including a signal source for providing a signal having a random characteristic, for applying reset pulses to said reset circuit at times determined at least in part by said random characteristic to disrupt said cyclic operation of said counting mechanism.

6. A subscription television system comprising: a signal source for producing a television signal including video components and synchronizing components; an encoding device coupled to said source having at least two operating conditions each of which establishes a different operating mode in said system effectively to encode said television signal from said source; a pulse counting mechanism effective upon the completion of a predetermined pulse counting cycle to effect actuation of said encoding device from one to another of its aforesaid operating conditions in accordance with a periodically repeating code pattern; means coupled to the aforesaid signal source for applying said synchronizing components to said counting mechanism to be counted thereby; means for selecting certain ones of said synchronizing components at predetermined intervals; and means, including means for utilizing the selected synchronizing components to interrupt said cycle and thereby control the timing of said counting mechanism, for varying said code pattern in a predetermined manner.

7. A subscription television system comprising: a signal source for producing a television signal including video components occuring during a series of field-trace intervals, line-synchronizing components occuring during said trace intervals, and field-synchronizing components occurring during interposed field-retrace intervals; an encoding device coupled to said source having at least two operating conditions each of which establishes a different operating mode in said system effectively to encode said television signal from said source; a pulse counting mechanism effective upon the completion of a predetermined pulse counting cycle to effect actuation of said encoding device from one to another of its aforesaid operating conditions in accordance with a periodically repeating code pattern; means coupled to the aforesaid signal source for applying said line-synchronizing components to said counting mechanism to be counted thereby to effect said actuation of said encoding device at periodically recurring times during said field-trace intervals; and means, including means for utilizing said field-synchronizing components to interrupt said cycle and thereby control the timing of said counting mechanism, for varying said code pattern in a predeterminde manner.

8. A subscription television transmitter comprising: a television signal source; a coding device coupled to said source having at least two operating conditions each of which establishes a different operating mode in said transmitter effectively to code the television signal from said source; a pulse counting mechanism responsive to a predetermined operating condition for registering a reference count and effective upon the registration of predetermined pulse counts to effect actuation of said coding device from one to another of its aforesaid operating conditions; at least one pulse-signal source for applying pulses to said counting mechanism to effect cyclic operation thereof; a reset circuit coupled to said pulse counting mechanism for establishing said predetermined operating condition; means, including a signal source for providing a signal having a random characteristic, for actuating said reset circuit at selected intervals determined at least in part by said random characteristic to disrupt said cyclic operation of said counting mechanism; and means for distributing to subscriber receivers a key signal conveying information concerning the actuation of said reset circuit.

9. A subscription television receiver for utilizing a television signal coded in accordance with a coding schedule comprising: an image-reproducing device and an associated scanning system; circuit means for supplying said television signal to said reproducing device and its scanning system; a decoding device included in said circuit means having at least two operating conditions each of which establishes a different operating mode in said receiver; a pulse counting mechanism responsive to a predetermined operating condition for registering a reference count and effective upon the registration of predetermined pulse counts related to the coding schedule of the television signal to effect actuation of said decoding device from one to another of its aforesaid operating conditions; means for deriving a series of pulses and for applying said pulses to said counting mechanism to effect cyclic operation thereof; a reset circuit coupled to said pulse counting mechanism and responsive to an applied pulse for establishing said predetermined operating condition and means, including a signal source for providing a signal having a random characteristic, for applying reset pulses to said reset circuit at times determined at least in part by said random characteristic to disrupt said cyclic operation of said counting mechanism.

10. A subscription television receiver for utilizing a television signal coded in accordance with a coding schedule, and for further utilizing a key signal having a random characteristic and indicating points of time reference of said coding schedule, said receiver comprising: an image-reproducing device and an associated scanning system; circuit means for supplying said television signal to said reproducing device and its scanning system; a decoding device included in said circuit means having at least two operating conditions each of which establishes a different operating mode in said receiver; a pulse counting mechanism responsive to a predetermined operating condtion for registering a reference count and effective upon the registration of predetermined pulse counts related to the coding schedule of the television signal to effect actuation of said decoding device from one to another of its aforesaid operating conditions; means for deriving a series of pulses from said coded television signal, and for applying said pulses to said counting mechanism to effect cyclic operation thereof; a reset circuit for said pulse counting mechanism; and means including means for utilizing said key signal to supply reset pulses to said reset circuit to establish said predetermined operating condition in said counting mechanism at times corresponding to said points of reference of said coding schedule, for repeatedly disrupting said cyclic operation of said counting mechanism.

11. In a subscription television system for translating a television signal having video components included within a recurring series of field-trace intervals, an encoding arrangement comprising: an encoding device having at least two distinct operating conditions each of which establishes a different operating mode in said system effectively to encode said television signal; a cycling mechanism having a plurality of operating steps in each cycle for producing a control pulse upon the completion of each cycle of operating steps; means coupling said cycling mechanism to said encoding device to actuate said device from one to another of its aforesaid operating conditions in response to each control pulse; and means, including a signal source for providing a signal having a random characteristic, for effecting actuation of said cycling mechanism at a rate that is faster than the recurrence rate of said field-trace intervals and in accordance with a code schedule determined at least in part by said random characteristic to effect corresponding faster-than-field rate operation of said encoding device.

12. In a subscription television system for translating a television signal having video components included within a recurring series of field-trace intervals, an encoding arrangement comprising: an encoding device having at least two distinct operating conditions each of which establishes a different operating mode in said system effectively to encode said television signal; a cycling mechanism having a plurality of operating steps in each cycle for producing a control pulse upon the completion of each cycle of operating steps; means coupling said cycling mechanism to said encoding device to actuate said device from one to another of its aforesaid operating conditions in response to each control pulse; means for effecting actuation of said cycling mechanism at a rate that is faster than the recurrence rate of said field-trace intervals thereby to effect corresponding faster-than-field rate operation of said encoding device; and means, including a signal source for providing a signal having a random characteristic, for resetting said cycling mechanism at times to a predetermined reference operating step in accordance with a prescribed reset schedule determined at least in part by said random characteristic.

13. In a subscription television system for translating a television signal: an encoding device having at least two operating conditions each of which establishes a predetermined operating mode in said system effectively to encode said television signal; a control mechanism having a sequence of operating steps for producing a control signal exhibiting a characteristic which varies between at least two predetermined values upon the completion of each sequence to represent a predetermined code pattern; means for developing a series of reset components occurring according to a predetermined code schedule; means, including means for applying each of said reset components to said control mechanism to interrupt its sequence of operating steps and to effect actuation of said control mechanism to a predetermined reference condition, for modifying said code pattern; and means coupling said control mechanism to said encoding device to effect actuation of said device in accordance with said modified code pattern.

14. In a subscription television system for translating a television signal comprising periodically recurring field-trace intervals and intervening field-retrace intervals: an encoding device having at least two operating conditions each of which establishes a predetermined operating mode in said system effectively to encode said television signal; a control mechanism having a sequence of operating steps for producing a control signal exhibiting a characteristic which varies between at least two predetermined values upon the completion of each sequence to represent a predetermined code pattern; means for developing a series of reset components timed according to a predetermined coding schedule and individually occurring during one of said field-retrace intervals; means, including means for applying each of said reset components to said control mechanism to interrupt its sequence of operating steps and to effect actuation of said control mechanism to a predetermined reference condition, for modifying said code pattern; and means coupling said control mechanism to said encoding device to effect actuation of said device in accordance with said modified code pattern.

15. In a subscription television system for translating a television signal: an encoding device having at least two distinct operating conditions each of which establishes a different operating mode in said system; a control mechanism coupled to said encoding device and responsive to an applied signal for effecting actuation of said encoding device between said operating conditions to encode said television signal in accordance with a predetermined code schedule; means for applying a periodic signal to said control mechanism to effect said actuation of said encoding device in a predetermined periodic repeating sequence; and means coupled to said control mechanism, and including means for interrupting said periodic sequence at times and effecting actuation of said encoding device to a predetermined one of said operating conditions, for modifying said code schedule.

16. A subscription television system comprising: encoding apparatus for varying the operating mode of said system in accordance with a predetermined periodically recurring mode-changing pattern; a source of code signal components; signal-translating means coupled to said source and to said encoding apparatus and having a plurality of translating conditions; and means, including means coupled to said translating means for varying the translating conditions thereof in accordance with a predetermined schedule, for altering said predetermined mode-changing pattern.

17. A subscription television system comprising: an encoding device having a plurality of operating conditions each of which establishes said system in a predetermined operating mode; a control mechanism coupled to said encoding device for effecting actuation of said device between its aforesaid operating conditions in accordance with a predetermined periodically recurring mode-changing pattern; a source of code signal components; means coupled to said source and to said control mechanism for translating said code signal components to said control mechanism; and means, including means for actuating said translating means to permit the translation of code signal components to said control mechanism only during certain spaced operating intervals, for modifying said mode-changing pattern.

18. A subscription television system comprising: an encoding device having a plurality of operating conditions each of which establishes said system in a predetermined operating mode; a control mechanism for developing a control signal representing a predetermined periodically recurring mode-changing pattern; means for applying said control signal to said encoding device to effect actuation thereof between its aforesaid operating conditions in accordance with said mode-changing pattern; a source of code signal components; signal-translating means having a plurality of translating conditions; means for developing a modifying signal representing a control schedule; means for applying said modifying signal to said translating means to render said translating means effective to translate said code signal components during spaced operating intervals determined by said control schedule; and means, including means coupled to said translating means for utilizing the translated code signal components to actuate said control mechanism, for altering said mode-changing pattern.

19. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals depending upon the duration of the counting cycle of said counting mechanism; a pulse-signal source coupled to said counting mechanism for applying input pulses thereto to effect actuation of said encoding device in accordance with a periodically recurring mode-changing pattern; and means, including means coupled to said counting mechanism for varying the duration of said counting cycle, for altering said mode-changing pattern.

20. An encoding arrangement for a subscription television system comprising: an encoding device having at least two operating conditions each of which establishes a different operating mode in said system; a pulse-actuated cycling mechanism having a number of operating steps in each cycle coupled to said encoding device to effect actuation thereof from one to another of its aforesaid operating conditions upon the completion of each cycle of operation; a pulse-signal source coupled to said cycling mechanism for applying input pulses thereto to advance said mechanism in a predetermined sequence from one step to the next in each operating cycle and effect actuation of said encoding device in accordance with a periodically recurring mode-changing pattern; and means, including means coupled to said counting mechanism for altering said predetermined sequence of operating steps to vary the absolute number of said input pulses required to complete an operating cycle, for altering said mode-changing pattern.

21. A television system for translating a television signal having a series of field-retrace intervals recurring at a predetermined field-scanning frequency, comprising: an encoding device having at least two operating conditions each of which establishes a different operating mode in said system effectively to encode said television signal; a control mechanism having a sequence of operating steps for producing a control signal exhibiting a characteristic which periodically varies upon the completion of each sequence as between at least two predetermined values and at a rate faster than said field-scanning frequency; means for resetting said control mechanism to a reference condition during any selected one of a plurality of different predetermined time intervals during each of said field-retrace intervals to interrupt the instantaneous sequence of operating steps and to initiate another sequence; and means for utilizing said control signal to effect actuation of said encoding device.

22. A secrecy communication system comprising: a control mechanism having a plurality of operating conditions; means for cyclically actuating said control mechanism between its aforesaid operating conditions to develop a control signal having a characteristic that varies periodically only after predetermined discrete time intervals in accordance with a predetermined mode-changing pattern; means, including means for disrupting the cyclic operation of said control mechanism during spaced mode-determining intervals in accordance with a predetermined code schedule, for varying the phase of said control signal from one to another of the intervening time intervals as between a plurality of possible phase conditions; means for developing an intelligence signal; and means coupled to said control mechanism and to said intelligence-signal-developing means for utilizing said control signal to effectively encode said intelligence signal.

23. A secrecy communication system comprising: a counting mechanism normally having a predetermined counting cycle, each count representing a different operating condition; means for cyclically actuating said counting mechanism between its aforesaid operating conditions to develop a control signal having a characteristic that varies periodically only after predetermined discrete time intervals in accordance with a predetermined mode-changing pattern; means, including means for resetting said counting mechanism to a reference operating condition at any selected one of several different instants within said counting cycle to disrupt the cylic operation of said counting mechanism during each of a series of spaced mode-determining intervals in accordance with a predetermined code schedule, for varying the phase of said control signal from one to another of the intervening time intervals as between several possible phase conditions; means for developing an intelligence signal; and means coupled to said counting mechanism and to said intelligence-signal-developing means for utilizing said control signal to effectively encode said intelligence signal.

24. A secrecy communication system comprising: a control mechanism having a plurality of operating conditions; means for cyclically actuating said control mechanism between its aforesaid operating conditions to develop a control signal having a characteristic that varies periodically only after predetermined discrete time intervals in accordance with a predetermined mode-changing pattern; a signal source for providing during spaced mode-determining intervals code signals individually having a pattern representing a selected one of several possible phase conditions of said control signal; means coupled to said source for utilizing said code signals to disrupt the cyclic operation of said control mechanism and to vary the phase of said control signal from one to another of the intervening time intervals as between the phase conditions represented by the patterns of the code signals; means for developing an intelligence signal; and means coupled to said control mechanism and to said intelligence-signal-developing means for utilizing said control signal to effectively encode said intelligence signal.

25. A secrecy communication system comprising: a control mechanism having a plurality of operating conditions; means for cyclically actuating said control mechanism between its aforesaid operating conditions to develop a control signal having a characteristic that varies periodically only after predetermined discrete time intervals in accordance with a predetermined mode-changing pattern; a signal source for providing during spaced mode-determining intervals code signals individually having a pattern varying from one mode-determining interval to the next to represent phase variations of said control signal; means coupled to said source for utilizing said code signals to variably disrupt the cyclic operation of said control mechanism and to differently vary the phase of said control signal from one to another of the intervening time intervals; means for developing an intelligence signal; and means coupled to said control mechanism and to said intelligence-signal-developing means for utilizing said control signal to effectively encode said intelligence signal.

26. A subscription television system for translating a television signal having a series of field-trace intervals and a corresponding series of intervening field-retrace intervals recurring at a predetermined field-scanning frequency, comprising: an encoding device having at least two operating conditions each of which establishes a different operating mode in said system effectively to encode said television signal; a cycling mechanism having a sequence of operating steps for producing a control signal exhibiting a characteristic which periodically varies upon the completion of each sequence as between at least two predetermined values and at a rate faster than said field-scanning frequency; means for resetting said cycling mechanism to a reference condition during any selected one of a plurality of different predetermined time intervals during certain ones of said field-retrace intervals to interrupt the instantaneous sequence of operating steps and to initiate another sequence thereby modifying said control signal; and means coupling said cycling mechanism to said encoding device to effect actuation thereof in accordance with the modified control signal.

27. An encoding arrangement for a subscription television system comprising: an encoding device having at least two operating conditions each of which establishes a different operating mode in said system; a pulse-counting mechanism coupled to said encoding device to effect actuation thereof from one to another of its aforesaid operating conditions at spaced intervals depending upon the registration of a preselected count by said counting mechanism; a pulse-signal source coupled to said counting mechanism for applying thereto a predetermined number of input pulses to effect said prescribed count registration; and means, including a signal source for providing a signal having a random characteristic, coupled to said counting mechanism for varying in accordance with said random characteristic the number of said input pulses required to effect said preselected count registration.

28. An encoding arrangement for a subscription television system comprising: an encoding device having at least two operating conditions each of which establishes a different operating mode in said system; a pulse-actuated cycling mechanism, having a number of operating steps starting from a predetermined reference condition in each cycle, coupled to said encoding device to effect actuation thereof from one to another of its aforesaid operating conditions upon the completion of each cycle of operation; a pulse-signal source coupled to said cycling mechanism for applying thereto a predetermined number of input pulses to advance said mechanism from one step to the next in a predetermined sequence to execute a cycle of operation; and means, including a signal source for providing a signal having a random characteristic, coupled to said cycling mechanism for altering said predetermined sequence of operating steps in accordance with said random characteristic to vary the number of said input pulses required to complete an operating cycle.

29. An encoding arrangement for a subscription television system comprising: an encoding device having at least two operating conditions each of which establishes a different operating mode in said system; a multi-step counting mechanism, coupled to said encoding device, responsive to applied signal components for advancing through its sequence of operating steps to effect actuation of said encoding device between its aforesaid operating conditions; a first signal source for developing a series of periodically recurring signal components; a second signal source for developing a series of randomly occurring code signal components representing a sub-combination in accordance with a predetermined code schedule; and means coupling said first and second sources to said control mechanism to effect both periodic and random actuation thereof in accordance with the combination of signal components conjointly determined by said periodically recurring signal components and said randomly occurring signal components.

*30. In transmitting means for a scrambled picture transmission system, means for generating picture signals, means coupled thereto for generating a plurality of different modes of said picture signals, and means coupled to and responsive to the aforesaid means for transmitting a different mode of the picture signals during different time periods which occur at a rate sufficient to render an unauthorized receiver display unintelligible, means including commutation means having a plurality of states for selecting from time to time which of said modes is transmitted, means coupled to said commutation means for driving the commutation means with shifting signals, means for generating randomly occurring signals for interrupting cycles of the commutation means at random times, and means for transmitting at least one signal from time to time based on said randomly occurring signals for causing synchronous interruption of cycles of commutation means at receivers.*

*31. In receiving means for receiving a scrambled picture transmission wherein picture signals are transmitted in one of a plurality of different modes during different time periods which occur at a rate sufficient to render an unauthorized receiver display unintelligible and wherein randomly occurring signals are transmitted representing random interruptions of cycles of commutation means at the transmitting means; means for resolving the different modes of said picture signals, means coupled to said resolving means and including commutation means having a plurality of states for selecting from time to time which of said modes is resolved in the resolution means, means for driving the commutation means with shifting signals, means for detecting said transmitted random signals, and means responsive thereto for generating signals for interrupting cycles of the receiver commutation means at random times.*

*32. In a scrambled information signal system, means for producing information carrying signals in any one of a plurality of modes including means for changing the mode of the information carrying signals from time to time in a coded manner, and means for temporarily disabling the mode changing means and causing the information carrying signals to invariably be in a given one of said modes while the mode changing means is disabled.*

References Cited by the Examiner

The following references, cited by the Examiner, are of record in the patented file of this patent or the original patent.

UNITED STATES PATENTS

| | | | |
|---|---|---|---|
| 2,547,598 | 4/51 | Roschke | 178—5.1 |
| 2,610,295 | 9/52 | Carbrey | 328—119 |
| 2,623,941 | 12/52 | Aram | 178—5.1 |
| 2,656,406 | 10/53 | Gray et al. | 178—5.1 |
| 2,656,407 | 10/53 | Herrick et al. | 178—5.1 |
| 2,694,103 | 11/54 | Druz et al. | 178—5.1 |
| 2,757,226 | 7/56 | Zworykin | 178—5.1 |

DAVID G. REDINBAUGH, *Primary Examiner.*

NEWTON N. LOVEWELL, *Examiner.*